(12) United States Patent
Dewa et al.

(10) Patent No.: US 8,492,448 B2
(45) Date of Patent: Jul. 23, 2013

(54) SYSTEMS AND METHODS FOR PERFORMING PHOTOREACTIONS USING LIGHT-DIFFUSING OPTICAL FIBER

(75) Inventors: Paul G Dewa, Newark, NY (US); Stephan Lvovich Logunov, Corning, NY (US); Paul John Shustack, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/269,071

(22) Filed: Oct. 7, 2011

(65) Prior Publication Data

US 2013/0090402 A1   Apr. 11, 2013

(51) Int. Cl.
 *C08F 2/46* (2006.01)
 *C08J 3/28* (2006.01)
 *H05B 6/68* (2006.01)

(52) U.S. Cl.
 USPC .................................................. 522/1; 520/1

(58) Field of Classification Search
 USPC .................................................. 522/1; 520/1
 See application file for complete search history.

(56) References Cited

U.S. PATENT DOCUMENTS

| | | | |
|---|---|---|---|
| 5,221,387 A | 6/1993 | Robbins et al. | |
| 6,097,536 A | 8/2000 | Bauer | |
| 6,835,679 B2 | 12/2004 | Bilanin et al. | |
| 7,081,278 B2 | 7/2006 | Lipson et al. | |
| 7,256,221 B2 | 8/2007 | Coykendall et al. | |
| 7,450,806 B2 | 11/2008 | Bookbinder et al. | |
| 2011/0122646 A1 * | 5/2011 | Bickham et al. | 362/554 |

FOREIGN PATENT DOCUMENTS

| | | | |
|---|---|---|---|
| DE | 102009044926 | | 9/2009 |
| GB | 2 423 279 | * | 8/2006 |
| GB | 2423279 | | 8/2010 |
| JP | 04082240 | | 3/1992 |
| WO | 2010/011299 | | 1/2010 |

OTHER PUBLICATIONS

Al-Obaidani, A., PhD Dissertation, Univ. of Nottingham, Div. of Matls. Mechanics and Structure, May 2009.
Yahathugoda, D., Evans, N., Endruweit, A., Long, A., SAMPE Europe Conference and Exhibition, Paris, Apr. 2007.
Al-Obaidani, A., et al., 13th European Conference on Composite Materials (ECCM13), Jun. 2-5, 2008, Stockholm, Sweden.
Graham Town, "Leaky optic fibres full of possibilities", Nov. 24, 2008. http://www.abc.net.au/science/articles/2008/11/24/2428060.htm.
Graham Town, "Leaky Optic Fibers Full of Holes OpenDoors to Lots of Opportunities", Nov. 24, 2008. http://www.infoniac.com/science/leaky-optic-fibers-full-of-holes.html.
Machine translation of DE102009044926.
Abstract of JP04082240.
PCT/US2012/058287 Search Report.

* cited by examiner

*Primary Examiner* — Ling Choi
*Assistant Examiner* — Jessica E Whiteley
(74) *Attorney, Agent, or Firm* — Svetlana Z. Short

(57) ABSTRACT

Systems and methods for performing photoreactions in a photoreactive material using scattered actinic light from at least one light-diffusing optical fiber are disclosed. The systems and methods include disposing a light-diffusing optical fiber relative to the photoreactive material. The light-diffusing optical fiber has a glass core, a surrounding cladding, and nano-sized structures situated either within the glass core or at the core-cladding boundary. The nano-sized structures are configured to scatter guided actinic light that travels in the light-diffusing optical fiber from an actinic light source. The scattered actinic light is provided throughout the photoreactive material and causes a photoreaction throughout the photoreactive material.

20 Claims, 22 Drawing Sheets

SYSTEMS AND METHODS FOR PERFORMING PHOTOREACTIONS USING LIGHT-DIFFUSING OPTICAL FIBER

FIELD

The present disclosure relates generally to photoreactions, and in particular relates to performing photoreactions in a photoreactive material using actinic light scattered from a light-diffusing optical fiber.

BACKGROUND

Performing photoreactions, such as photocuring or photochemistry, involves delivering actinic light (usually ultraviolet or visible light) from an actinic light source to a particular photoreactive material.

In many instances, the photoreactive material is arranged such that it can be exposed directly with the actinic light from an actinic light source, perhaps with the assistance of collimating or focusing optics. However, there are cases where the photoreactive material cannot be directly exposed in "free space" with the actinic light. For example, the photoreactive material may be between two pieces of metal that need to be bonding by photocuring the photoreactive material. The photoreactive material may be inside an opaque pipe or other type of enclosed or semi-enclosed container, or beneath an opaque layer of paint. While the photoreactive material may be arranged such that it presents a surface that may receive free-space illumination of actinic light, the arrangement may be such that the actinic light cannot reach throughout the photoreactive material. This results in only a portion of the photoreactive material being exposed and undergoing the particular photoreaction.

Thus, there is a need for performing photoreactions in a manner that allows for actinic light to be delivered to photoreactive materials, particularly in circumstances where free-space illumination of actinic radiation cannot be effectively used to create a photoreaction throughout the photoreactive material.

SUMMARY

An embodiment of the disclosure includes an illumination system for performing a photoreaction in a photoreactive material. The system includes an actinic light source that generates actinic light. The system also has at least one light-diffusing optical fiber optically coupled to the actinic light source. The at least one light-diffusing optical fiber has a glass core, a cladding surrounding the glass core, and an outer surface, and further comprises a plurality of nano-sized structures situated within the glass core or at a core-cladding boundary. The at least one light-diffusing optical fiber is configured to guide the actinic light as guided actinic light and to scatter the guided actinic light to form scattered actinic light that travels through the outer surface. The illumination system also includes the photoreactive material. The at least one light-diffusing optical fiber is disposed relative to the photoreactive material so that the photoreactive material receives the scattered actinic light and causes a photoreaction throughout the photoreactive material. Example photoreactive materials include at least one of a photocuring substance and a photochemical substance.

Another embodiment of the disclosure includes an optical assembly. The optical assembly includes an optics mount and an optical element disposed in the optics mount. The optical assembly also includes a light-curable potting compound disposed between a portion of the optics mount and a portion of the optical element. The light-curable potting compound cures when exposed to actinic light. The optical assembly includes a light-diffusing optical fiber at least partially embedded within the light-curable potting compound. The light-diffusing optical fiber is configured to deliver the actinic light throughout the light-curable potting compound to cure the light-curable potting compound when the actinic light is introduced into the light-diffusing optical fiber, wherein the cured light-cured potting compound fixes the optical element to the optics mount.

Another embodiment of the disclosure includes a method of performing a photoreaction in a photoreactive material using actinic light. The method includes partially or completely embedding at least a portion of a light-diffusing optical fiber in the photoreactive material. The light-diffusing optical fiber has a glass core, a cladding surrounding the glass core, and an outer surface, and further comprises a plurality of nano-sized structures situated within the glass core or at a core-cladding boundary. The nano-sized structures are configured to scatter the actinic light. The method also includes coupling the actinic light into the light-diffusing optical fiber to form guided actinic light. The method further includes scattering the guided actinic light out of the outer surface of light-diffusing optical fiber by operation of the nano-sized structures to form scattered actinic light that travels throughout the photoreactive material, thereby causing the photoreaction throughout the photoreactive material.

It is to be understood that both the foregoing general description and the following Detailed Description represent embodiments of the disclosure, and are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure and together with the description serve to explain the principles and operations of the disclosure. The claims are incorporated into and constitute part of the Detailed Description set forth below.

Figure 1:
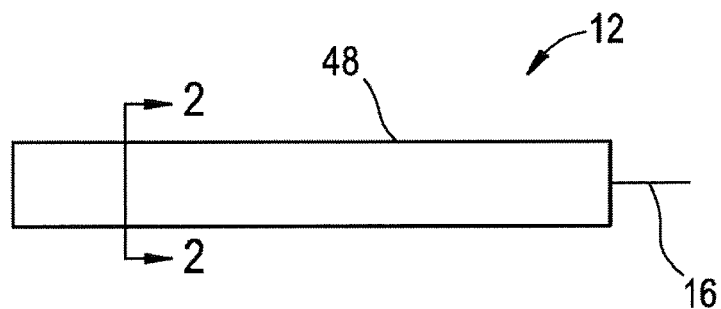
FIG. 1 is a schematic side view of a section of an example embodiment of light-diffusing optical fiber.

Additional features and advantages of the disclosure are set forth in the Detailed Description that follows and will be apparent to those skilled in the art from the description or recognized by practicing the disclosure as described herein, together with the claims and appended drawings.

DETAILED DESCRIPTION

Reference is now made in detail to embodiments of the disclosure, examples of which are illustrated in the accompanying drawings. Whenever possible, like or similar reference numerals are used throughout the drawings to refer to like or similar parts. It should be understood that the embodiments disclosed herein are merely examples, each incorporating certain benefits of the present disclosure.

Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure, in view of but not limited to the embodiments described herein.

DEFINITIONS

Terms such as "horizontal," "vertical," "front," "back," etc., and the use of Cartesian Coordinates are for the sake of reference in the drawings and for ease of description and are not intended to be strictly limiting either in the description or in the claims as to an absolute orientation and/or direction.

In the description of the disclosure below, the following terms and phrases are used in connection to light-diffusing optical fibers having nano-sized structures.

The "refractive index profile" is the relationship between the refractive index or the relative refractive index and the waveguide (fiber) radius.

The "relative refractive index percent" is defined as $$\Delta(r)\% = 100 \times [n(r)^2 - n_{REF}^2)]/2n(r)^2,$$

where n(r) is the refractive index at radius r, unless otherwise specified. The relative refractive index percent is defined at 850 nm unless otherwise specified. In one aspect, the reference index $n_{REF}$ is silica glass with the refractive index of 1.452498 at 850 nm, in another aspect is the maximum refractive index of the cladding glass at 850 nm As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants.

Likewise, one or more other dopants which are not downdopants may be present in a region of an optical fiber having a negative relative refractive index.

The term "α-profile" or "alpha profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)$% is zero, and r is in the range $r_i \leq r \leq r_f$, where $\Delta$ is defined above, $r_i$ is the initial point of the α-profile, $r_f$ is the final point of the α-profile, and α is an exponent which is a real number.

As used herein, the term "parabolic" therefore includes substantially parabolically shaped refractive index profiles which may vary slightly from an α value of 2.0 at one or more points in the core, as well as profiles with minor variations and/or a centerline dip. In some exemplary embodiments, α is greater than 1.5 and less than 2.5, more preferably greater than 1.7 and 2.3 and even more preferably between 1.8 and 2.3 as measured at 850 nm. In other embodiments, one or more segments of the refractive index profile have a substantially step index shape with an α value greater than 8, more preferably greater than 10 even more preferably greater than 20 as measured at 850 nm.

The term "nano-structured fiber region" describes the fiber having a region or area with a large number (greater than 50) of gas filled voids, or other nano-sized structures, e.g., more than 50, more than 100, or more than 200 voids in the cross-section of the fiber. The gas filled voids may contain, for example, $SO_2$, Kr, Ar, $CO_2$, $N_2$, $O_2$, or mixture thereof The cross-sectional size (e.g., diameter) of nano-sized structures (e.g., voids) as described herein may vary from 10 nm to 1 μm (for example, 50 nm-500 nm), and the length may vary from 1 millimeter 50 meters (e.g., 2 mm to 5 meters, or 5 mm to 1 m range).

Figure 4A:
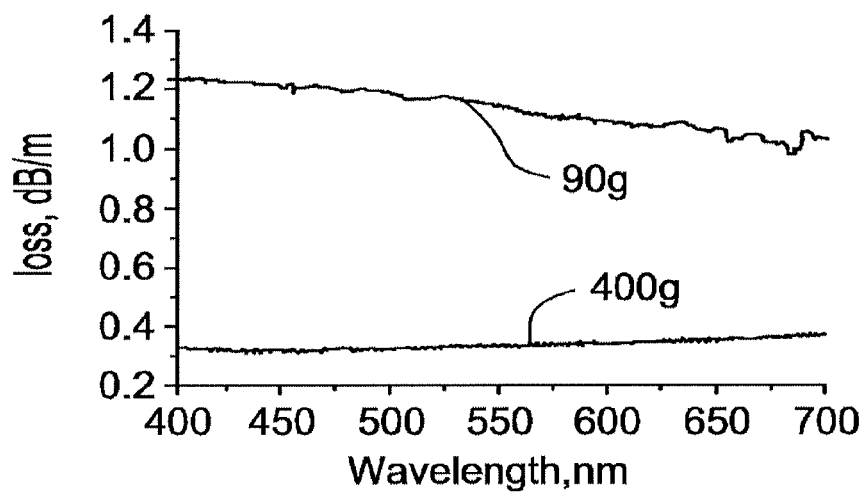
FIGS. 4A and 4B depict fiber attenuation (loss) in dB/m versus wavelength (nm)
Figure 4B:
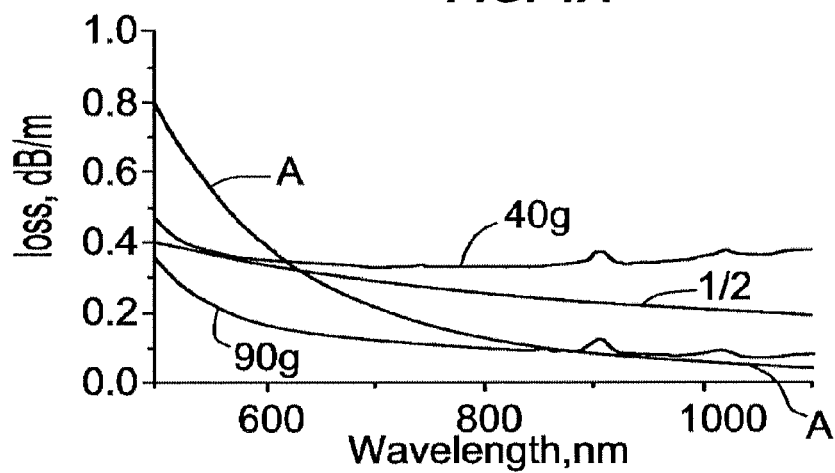

In standard single mode or multimode optical fibers, the losses at wavelengths less than 1300 nm are dominated by Rayleigh scattering. These Rayleigh scattering loss Ls is determined by the properties of the material and are typically about 20 dB/km for visible wavelengths (400-700 nm). Rayleigh scattering losses also have a strong wavelength dependence (i.e., $L_S \propto 1/\lambda^4$, see FIG. 4B, comparative fiber A), which means that at least about 1 km to 2 km of the fiber is needed to dissipate more than 95% of the input light. Shorter lengths of such fiber would result in lower illumination efficiency, while using long lengths (1 km to 2 km, or more) can be more costly and can be difficult to manage. The long lengths of fiber, when used in a bioreactor or other illumination system may be cumbersome to install.

In certain configurations for illumination and lighting applications it may be desirable to use shorter lengths of fiber, for example, 1-100 meters. This requires an increase of scattering loss from the fiber, while being able to maintain good angular scattering properties (uniform dissipation of light away from the axis of the fiber) and good bending performance to avoid bright spots at fiber bends. A desirable attribute of at least some of the embodiments of present disclosure described herein is uniform and high illumination along the length of the fiber illuminator. Because the optical fiber is flexible, it allows a wide variety of the illumination shapes to be deployed. It is preferable to have no bright spots (due to elevated bend losses) at the bending points of the fiber, such that the illumination provided by the fiber does not vary by more than 30%, preferably less than 20% and more preferably less than 10%. For example, in at least some embodiments, the average scattering loss of the fiber is greater than 50 dB/km, and the scattering loss does not vary more than 30% (i.e., the scattering loss is within ±30% of the average scattering loss) over any given fiber segment of 0.2 m length. According to at least some embodiments, the average scattering loss of the fiber is greater than 50 dB/km, and the scattering loss does not vary more than 30% over the fiber segments of less than 0.05 m length. According to at least some embodiments, the average scattering loss of the fiber is greater than 50 dB/km, and the scattering loss does not vary more than 30% (i.e., ±30%) over the fiber segments 0.01 m length. According to at least some embodiments, the average scattering loss of the fiber is greater than 50 dB/km, and the scattering loss does not vary more than 20%(i.e., ±20%) and preferably by not more than 10% (i.e., ±10%) over the fiber segments 0.01 m length.

In at least some embodiments, the intensity variation of the integrated (diffused) light intensity coming through sides of the fiber at the illumination wavelength is less than 30% for target length of the fiber, which can be, for example, 0.02-100 m length. It is noted that the intensity of integrated light intensity through sides of the fiber at a specified illumination wavelength can be varied by incorporating fluorescence material in the cladding or coating. The wavelength of the light scattering by the fluorescent material is different from the wavelength of the light propagating in the fiber.

In some the following exemplary embodiments we describe fiber designs with a nano-structured fiber region (region with nano-sized structures) placed in the core area of the fiber, or very close to core. Some of the fiber embodiments have scattering losses in excess of 50 dB/km (for example, greater than 100 dB/km, greater than 200 dB/km, greater than 500 dB/km, greater than 1000 dB/km, greater than 3000 dB/km, greater than 5000 dB/km), the scattering loss (and thus illumination, or light radiated by these fibers) is uniform in angular space.

In order to reduce or to eliminate bright spots as bends in the fiber, it is desirable that the increase in attenuation at a 90° bend in the fiber is less than 5 dB/turn (for example, less than 3 dB/turn, less than 2 dB/turn, less than 1 dB/turn) when the bend diameter is less than 50 mm In exemplary embodiment, these low bend losses are achieved at even smaller bend diameters, for example, less than 20 mm, less than 10 mm, and even less than 5 mm Preferably, the total increase in attenuation is less than 1 dB per 90 degree turn at a bend radius of 5 mm.

Preferably, according to some embodiments, the bending loss is equal to or is lower than intrinsic scattering loss from the core of the straight fiber. The intrinsic scattering is predominantly due to scattering from the nano-sized structures. Thus, according to at least the bend insensitive embodiments of optical fiber, the bend loss does not exceed the intrinsic scattering for the fiber. However, because the scattering level is a function of bending diameter, the bending deployment of the fiber depends on its scattering level. For example, in some of the embodiments, the fiber has a bend loss less than 3 dB/turn, preferably less than 2 dB/turn, and the fiber can be bent in an arc with a radius as small as 5 mm radius without forming bright spots.

Also, in the description below, in some embodiments where it is said that scattered actinic light is provided or delivered throughout a photoreactive material, the scattered actinic light is assumed to have sufficient intensity to perform a photoreaction on the photoreactive material in a reasonable period of time.

Light-Diffusing Optical Fiber

Figure 2:
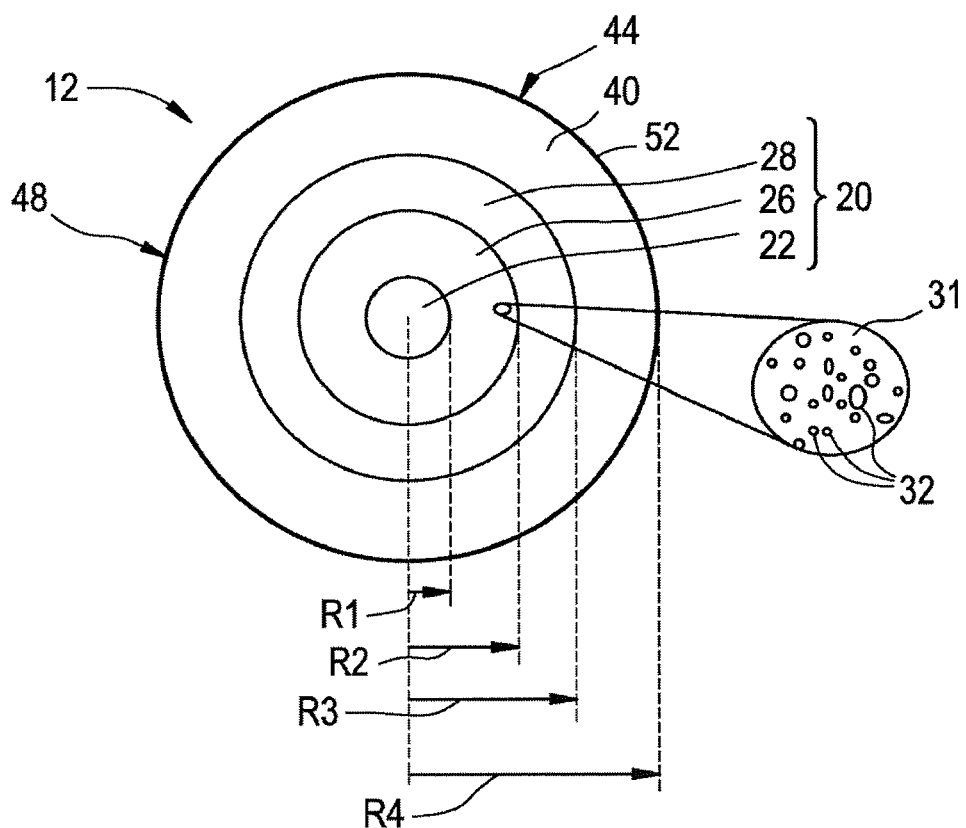
FIG. 2 is a schematic cross-section of the optical fiber of FIG. 1 as viewed along the direction 2-2.

FIG. 1 is a schematic side view of a section of an example embodiment of a light-diffusing optical fiber (also referred to hereinafter as "fiber") 12 having a central axis ("centerline") 16. FIG. 2 is a schematic cross-section of light-diffusing optical fiber 12 as viewed along the direction 2-2 in FIG. 1. Fiber 12 can be, for example, any one of the various types of optical fiber with a nano-structured fiber region having periodic or non-periodic nano-sized structures 32 (for example voids). In an example embodiment, fiber 12 includes a core 20 divided into three sections or regions. These core regions are: a solid central portion 22, a nano-structured ring portion (inner annular core region) 26, and outer, solid portion 28 surrounding the inner annular core region 26. A cladding region 40 ("cladding") surrounds the annular core 20 and has an outer surface. The cladding 40 may have low refractive index to provide a high numerical aperture (NA). The cladding 40 can be, for example, a low index polymer such as UV or thermally curable fluoroacrylate or silicone.

An optional coating 44 surrounds the cladding 40. Coating 44 may include a low modulus primary coating layer and a high modulus secondary coating layer. In at least some embodiments, coating layer 44 comprises a polymer coating such as an acrylate-based or silicone based polymer. In at least some embodiments, the coating has a constant diameter along the length of the fiber.

In other exemplary embodiments described below, coating 44 is designed to enhance the distribution and/or the nature of "radiated light" that passes from core 20 through cladding 40. The outer surface of the cladding 40 or the of the outer of optional coating 44 represents the "sides" 48 of fiber 12 through which light traveling in the fiber is made to exit via scattering, as described herein.

A protective cover or sheath (not shown) optionally covers cladding 40. Fiber 12 may include a fluorinated cladding 40, but the fluorinated cladding is not needed if the fibers are to be used in short-length applications where leakage losses do not degrade the illumination properties.

In some exemplary embodiments, the core region 26 of fiber 12 comprises a glass matrix ("glass") 31 with a plurality of non-periodically disposed nano-sized structures (e.g., "voids") 32 situated therein, such as the example voids shown in detail in the magnified inset of FIG. 2. In another example embodiment, voids 32 may be periodically disposed, such as in a photonic crystal optical fiber, wherein the voids typically have diameters between about $1\times10^{-6}$ m and $1\times10^{-5}$ m. Voids 32 may also be non-periodically or randomly disposed. In some exemplary embodiment, glass 31 in region 26 is fluorine-doped silica, while in other embodiment the glass is undoped pure silica. Preferably the diameters of the voids are at least 10 nm.

The nano-sized structures 32 scatter the light away from the core 20 and toward the outer surface of the fiber. The scattered light is then "diffused" through of the outer surface of the fiber 12 to provide the desired illumination. That is, most of the light is diffused (via scattering) through the sides of the fiber 12, along the fiber length. Preferably, the fiber emits substantially uniform radiation over its length, and the fiber has a scattering-induced attenuation of greater than 50 dB/km in the wavelength(s) of the emitted radiation (illumination wavelength). Preferably, the scattering-induced attenuation is greater than 100 dB/km for this wavelength. In some embodiments, the scattering-induced attenuation is greater than 500 dB/km for this wavelength, and in some embodiments is 1000 dB/km, greater than 2000 dB/km, and greater than 5000 dB/km. These high scattering losses are about 2.5 to 250 times higher than the Rayleigh scattering losses in standard single mode and multimode optical fibers.

The glass making up core regions 22 and 28 may include updopants, such as Ge, Al, and/or P. By "non-periodically disposed" or "non-periodic distribution," it is meant that when one takes a cross-section of the optical fiber (such as shown in FIG. 2), the voids 32 are randomly or non-periodically distributed across a portion of the fiber. Similar cross sections taken at different points along the length of the fiber will reveal different cross-sectional void patterns, i.e., various cross sections will have different voids patterns, wherein the distributions of voids and sizes of voids do not match. That is, the voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. While not wishing to be bound by theory, it is believed that the voids extend less than 10 meters, and in many cases less than 1 meter along the length of the fiber.

The fiber 12 as used herein in the illumination systems discussed below can be made by methods which utilize preform consolidation conditions which result in a significant amount of gases being trapped in the consolidated glass blank, thereby causing the formation of voids in the consolidated glass optical fiber preform. Rather than taking steps to remove these voids, the resultant preform is used to form an optical fiber with voids, or nano-sized structures, therein. The resultant fiber's nano-sized structures or voids are utilized to scatter or guide the light out of the fiber, via its sides, along the fiber length. That is, the light is guided away from the core 20, through the outer surface of the fiber, to provide the desired illumination.

As used herein, the diameter of a nano-sized structure such as void is the longest line segment whose endpoints a) when the optical fiber is viewed in perpendicular cross-section transverse to the longitudinal axis of the fiber. Method of making optical fibers with nano-sized voids is described, for example, in U.S. patent application Ser. No. 11/583,098, which is incorporated herein by reference.

As described above, in some embodiments of fiber 12, core sections 22 and 28 comprise silica doped with germanium, i.e., germania-doped silica. Dopants other than germanium, singly or in combination, may be employed within the core, and particularly at or near the centerline 16, of the fiber to obtain the desired refractive index and density. In at least some embodiments, the relative refractive index profile of the optical fiber disclosed herein is non-negative in sections 22 and 28. These dopants may be, for example, Al, Ti, P, Ge, or a combination thereof In at least some embodiments, the optical fiber contains no index-decreasing dopants in the core. In some embodiments, the relative refractive index profile of the optical fiber disclosed herein is non-negative in sections 22, 24 and 28.

In some examples of fiber 12 as used herein, the core 20 comprises pure silica. In one embodiment, a preferred attribute of the fiber is the ability to scatter light out of the fiber (i.e., to diffuse light) in the desired spectral range to which a biological material is sensitive or that causes a photoreaction in a photoreactive material. In another embodiment, the scattered light may be used for decorative accents and white light applications. The amount of the loss via scattering can be increased by changing the properties of the glass in the fiber, the width of the nano-structured region 26, and the size and the density of the nano-sized structures.

In some examples of fiber 12 as used herein, core 20 is a graded-index core, and preferably, the refractive index profile of the core has a parabolic (or substantially parabolic) shape; for example, in some embodiments, the refractive index profile of core 20 has an α-shape with an α value of about 2, preferably between 1.8 and 2.3 as measured at 850 nm. In other embodiments, one or more segments of the refractive index profile have a substantially step index shape with an α value greater than 8, more preferably greater than 10 even more preferably greater than 20 as measured at 850 nm. In some embodiments, the refractive index of the core may have a centerline dip, wherein the maximum refractive index of the core, and the maximum refractive index of the entire optical fiber, is located a small distance away from centerline 16, but in other embodiments the refractive index of the core has no centerline dip, and the maximum refractive index of the core, and the maximum refractive index of the entire optical fiber, is located at the centerline.

In an exemplary embodiment, fiber 12 has a silica-based core 20 and depressed index (relative to silica) polymer cladding 40. The low index polymer cladding 40 preferably has a relative refractive index that is negative, more preferably less than −0.5% and even more preferably less than −1%. In some exemplary embodiments cladding 40 has thickness of 20 μm or more. In some exemplary embodiments cladding 40 has a lowed refractive index than than the core, and a thickness of 10 μm or more (e.g., 20 μm or more). In some exemplary embodiments, the cladding has an outer diameter 2 times Rmax, e.g., of about 125 μm (e.g., 120 μm to 130 μm, or 123 μm to 128 μm). In other embodiments the cladding has the diameter that is less than 120 μm, for example 60 or 80 μm. In other embodiments the outer diameter of the cladding is greater than 200 μm, greater than 300 μm, or greater than 500 μm. In some embodiments, the outer diameter of the cladding has a constant diameter along the length of fiber 12. In some embodiments, the refractive index of fiber 12 has radial symmetry. Preferably, the outer diameter 2R3 of core 20 is constant along the length of the fiber. Preferably the outer diameters of core sections 22, 26, 28 are also constant along the length of the fiber. By constant, we mean that the variations in the diameter with respect to the mean value are less than 10%, preferably less than 5% and more preferably less than 2%.

Figure 3A:
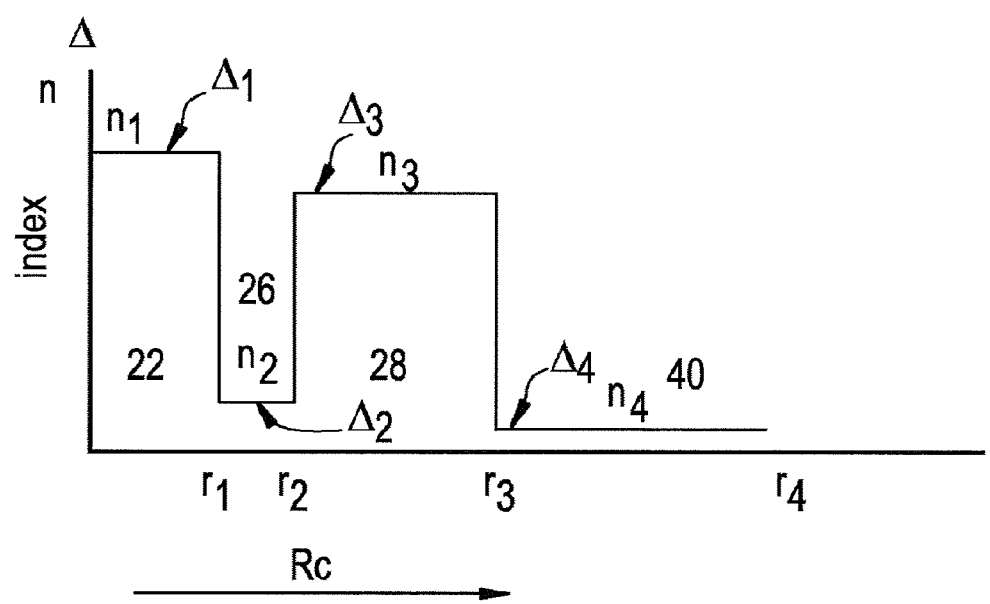
FIG. 3A is a schematic illustration of relative refractive index plot versus fiber radius for an exemplary embodiment of the light-diffusing optical fiber illustrating an example index profile for the fiber.

FIG. 3A is a plot of the exemplary relative refractive index Δ versus fiber radius for an example fiber 12 shown in FIG. 2 (solid line). The core 20 may also have a graded core profile, characterized, for example, by an α-value between 1.7 and 2.3 (e.g., 1.8 to 2.3). An alternative exemplary refractive index profile is illustrated by the dashed lines. Core region 22 extends radially outwardly from the centerline to its outer radius, R1, and has a relative refractive index profile $\Delta_1(r)$ corresponding to a maximum refractive index n1 (and relative refractive index percent $\Delta_{1MAX}$). In this embodiment, the reference index $n_{REF}$ is the refractive index at the cladding. The second core region (nano-structured region) 26 has minimum refractive index n2, a relative refractive index profile $\Delta 2(r)$, a maximum relative refractive index $\Delta 2_{MAX}$, and a minimum relative refractive index $\Delta 2_{MIN}$, where in some embodiments $\Delta 2_{MAX} = \Delta 2_{MIN}$. The third core region 28 has a maximum refractive index n3, a relative refractive index profile $\Delta 3(r)$ with a maximum relative refractive index $\Delta 3_{MAX}$ and a minimum relative refractive index $\Delta 3_{MIN}$, where in some embodiments $\Delta 3_{MAX} = \Delta 3_{MIN}$. In this embodiment the annular cladding 40 has a refractive index n4, a relative refractive index profile $\Delta 4(r)$ with a maximum relative refractive index $\Delta 4_{MAX}$, and a minimum relative refractive index $\Delta 4_{MIN}$. In some embodiments $\Delta 4_{MAX} = \Delta 4_{MIN}$. In some embodiments, $\Delta 1_{MAX} > \Delta 4_{MAX}$ and $\Delta 3_{MAX} > \Delta 4_{MAX}$. In some embodiments $\Delta 2_{MIN} > \Delta 4_{MAX}$. In the embodiment shown in FIGS. 2 and 3A, $\Delta 1_{MAX} > \Delta 3_{MAX} > \Delta 2_{MAX} > \Delta 4_{MAX}$. In this embodiment the refractive indices of the regions have the following relationship n1>n3>n2>n4.

In some embodiments, core regions 22, 28 have a substantially constant refractive index profile, as shown in FIG. 3A with a constant $\Delta 1(r)$ and $\Delta 3(r)$. In some of these embodiments, $\Delta 2(r)$ is either slightly positive ($0 < \Delta 2(r) < 0.1\%$), negative ($-0.1\% < \Delta 2(r) < 0$), or 0%. In some embodiments the absolute magnitude of $\Delta 2(r)$ is less than 0.1%, preferably less than 0.05%. In some embodiments, the outer cladding region 40 has a substantially constant refractive index profile, as shown in FIG. 3A with a constant $\Delta 4(r)$. In some of these embodiments, $\Delta 4(r) = 0\%$. The core section 22 has a refractive index where $\Delta 1(r) > 0\%$. In some embodiments, the void-filled region 26 has a relative refractive index profile $\Delta 2(r)$ having a negative refractive index with absolute magnitude less than 0.05%, and $\Delta 3(r)$ of the core region 28 can be, for example, positive or zero. In at least some embodiments, n1>n2 and n3>n4.

In some embodiments the cladding 40 has a refractive index $-0.05\% < \Delta 4(r) < 0.05\%$. In other embodiments, the cladding 40 and the core portions portion 20, 26, and 28 may comprise pure (undoped) silica.

In some embodiments, the cladding 40 comprises pure or F-doped silica. In some embodiments, the cladding 40 comprises pure low index polymer. In some embodiments, nano-structured region 26 comprises pure silica comprising a plurality of voids 32. Preferably, the minimum relative refractive index and the average effective relative refractive index, taking into account the presence of any voids, of nano-structured region 26 are both less than −0.1%. The voids or voids 32 may contain one or more gases, such as argon, nitrogen, oxygen, krypton, or $SO_2$ or can contain a vacuum with substantially no gas. However, regardless of the presence or absence of any gas, the average refractive index in nano-structured region 26 is lowered due to the presence of voids 32. Voids 32 can be randomly or non-periodically disposed in the nano-structured region 26, and in other embodiments, the voids are disposed periodically therein.

In some embodiments, the plurality of voids 32 comprises a plurality of non-periodically disposed voids and a plurality of periodically disposed voids.

In example embodiments, core section 22 comprises germania doped silica, core inner annular region 28 comprises pure silica, and the cladding annular region 40 comprises a glass or a low index polymer. In some of these embodiments, nano-structured region 26 comprises a plurality of voids 32 in pure silica; and in yet others of these embodiments, nano-structured region 26 comprises a plurality of voids 32 in fluorine-doped silica.

In some embodiments, the outer radius Rc of core is greater than 10 μm and less than 600 μm. In some embodiments, the outer radius Rc of core is greater than 30 μm and/or less than 400 μm. For example, Rc may be 125 μm to 300 μm. In other embodiments, the outer radius Rc of the core 20 (note that in the embodiment shown in FIG. 3A, Rc=R3) is larger than 50 μm and less than 250 μm. The central portion 22 of the core 20 has a radius in the range $0.1Rc \leq R_1 \leq 0.9Rc$, preferably $0.5Rc \leq R_1 \leq 0.9Rc$. The width W2 of the nano-structured ring region 26 is preferably $0.05Rc \leq W2 \leq 0.9Rc$, preferably $0.1Rc \leq W2 \leq 0.9Rc$, and in some embodiments $0.5Rc \leq W2 \leq 0.9Rc$ (a wider nano-structured region gives a higher scattering-induced attenuation, for the same density of nano-sized structures). The solid glass core region 28 has a width Ws=W3 such that 0.1Rc>W 3>0.9Rc. Each section of the core 20 comprises silica based glass. The radial width $W_2$ of nano-structured region 26 is preferably greater than 1 μm. For example, $W_2$ may be 5 μm to 300 μm, and preferably 200 μm or less. In some embodiments, $W_2$ is greater than 2 μm and less than 100 μm. In other embodiments, W2 is greater than 2 μm and less than 50 μm. In other embodiments, $W_2$ is greater than 2 μm and less than 20 μm. In some embodiments, $W_2$ is at least 7 μm. In other embodiments, $W_2$ is greater than 2 μm and less than 12 μm. The width $W_3$ of core region 28 is (R3−R2) and its midpoint $R_{3MID}$ is (R2+R3)/2. In some embodiments, $W_3$ is greater than 1 um and less than 100 μm.

The numerical aperture (NA) of fiber 12 is preferably equal to or greater than the NA of a light source directing light into the fiber. Preferably the numerical aperture (NA) of fiber 12 is greater than 0.2, in some embodiments greater than 0.3, and even more preferably greater than 0.4.

In some embodiments, the core outer radius R1 of the first core region 22 is preferably not less than 24 μm and not more than 50 μm, i.e. the core diameter is between about 48 and 100 μm. In other embodiments, R1>24 microns; in still other embodiments, R1>30 microns; in yet other embodiments, R1>40 microns.

In some embodiments, $|\Delta_2(r)|<0.025\%$ for more than 50% of the radial width of the annular inner portion 26, and in other embodiments $|\Delta_2(r)|<0.01\%$ for more than 50% of the radial width of region 26. The depressed-index annular portion 26 begins where the relative refractive index of the cladding first reaches a value of less than −0.05%, going radially outwardly from the centerline. In some embodiments, the cladding 40 has a relative refractive index profile $\Delta 4(r)$ having a maximum absolute magnitude less than 0.1%, and in this embodiment $\Delta 4_{MAX}<0.05\%$ and $\Delta 4_{MIN}>-0.05\%$, and the depressed-index annular portion 26 ends where the outermost void is found.

Cladding structure 40 extends to a radius R4, which is also the outermost periphery of the optical fiber. In some embodiments, the width of the cladding, R4−R3, is greater than 20 μm; in other embodiments R4−R3 is at least 50 μm, and in some embodiments, R4−R3 is at least 70 μm.

In another embodiment, the entire core 20 is nano-structured (filled with voids, for example), and the core 20 is surrounded by the cladding 40. The core 20 may have a "step" refractive index delta, or may have a graded core profile, with α-profile having, for example, α-value between 1.8 and 2.3.

Preparation of an optical preform (not shown) used to form fibers 12 was formed in one exemplary embodiment wherein 470 grams of $SiO_2$ (0.5 g/cc density) soot are deposited via outside vapor deposition (OVD) onto a fully consolidated 1 meter long, 20 mm diameter pure silica void-free core cane, resulting in a preform assembly (sometimes referred to as a preform, or an optical preform) comprising a consolidated void-free silica core region which was surrounded by a soot silica region. The soot cladding of this preform assembly was then sintered as follows. The preform assembly was first dried for 2 hours in an atmosphere comprising helium and 3 percent chlorine (all percent gases by volume) at 1100° C. in the upper-zone part of the furnace, followed by down driving at 200 mm/min (corresponding to approximately a 100° C./min temperature increase for the outside of the soot preform during the downdrive process) through a hot zone set at approximately 1500° C. in a 100 percent $SO_2$ (by volume) sintering atmosphere. The preform assembly was then down driven again (i.e., a second time) through the hot zone at the rate of 100 mm/min (corresponding to an approximately 50° C./min temperature increase for the outside of the soot preform during the downdrive process). The preform assembly was then down driven again (i.e., a third time) through the hot zone at the rate of 50 mm/min (corresponding to an approximately 25° C./min temperature increase for the outside of the soot preform during the downdrive process). The preform assembly was then down driven again (i.e., a fourth time) through the hot zone at the rate of 25 mm/min (corresponding to an approximately 12.5° C./min temperature increase for the outside of the soot preform during the downdrive process), then finally sintered at 6 mm/min (approximately 3° C./min heat up rate) in order to sinter the soot into an $SO_2$-seeded silica overclad preform. Following each downdrive step, the preform assembly was updriven at 200 mm/min into the upper-zone part of the furnace (which remained set at 1100° C.). The first series of higher downfeed rate are employed to glaze the outside of the optical fiber preform, which facilitates trapping of the gases in the preform. The preform was then placed for 24 hours in an argon purged holding oven set at 1000° C. to outgas any remaining helium in the preform. This preform was then redrawn in an argon atmosphere on a conventional graphite redraw furnace set at approximately 1700° C. into void-free $SiO_2$ core, $SO_2$-seeded (i.e., containing the non-periodically located voids containing $SO_2$ gas) silica overclad canes which were 10 mm in diameter and 1 meter long.

One of the 10 mm canes was placed back in a lathe where about 190 grams of additional $SiO_2$ (0.52 g/cc density) soot was deposited via OVD. The soot of this cladding (which may be called overcladding) for this assembly was then sintered as follows. The assembly was first dried for 2 hours in an atmosphere consisting of helium and 3 percent chlorine at 1100° C. followed by down driving at 5 mm/min through a hot zone set at 1500° C. in a 100% helium (by volume) atmosphere in order to sinter the soot to a germania containing void-free silica core, silica $SO_2$-seeded ring (i.e. silica with voids containing $SO_2$), and void-free overclad preform. The preform was placed for 24 hours in an argon purged holding oven set at 1000° C. to outgas any remaining helium from the preform. The optical fiber preform was drawn to 3 km lengths of 125 micron diameter optical fiber at approximately 1900° C. to 2000° C. in a helium atmosphere on a graphite resistance furnace. The temperature of the optical preform was controlled by monitoring and controlling the optical fiber tension; in this embodiment the fiber tension was held at one value between 30 and 600 grams during each portion (e.g., 3 km lengths) of a fiber draw run. The fiber was coated with a low index silicon based coating during the draw process.

Another 10 mm void-free silica core $SO_2$-seeded silica overclad canes described above (i.e., a second cane) was utilized to manufacture the optical preform and fibers for examples shown in FIG. 4B. More specifically, the second 10 mm void-free silica core $SO_2$-seeded silica overclad cane was placed back in a lathe where about 3750 grams of additional $SiO_2$ (0.67 g/cc density) soot are deposited via OVD. The soot of this cladding (which may be called overcladding for this assembly) was then sintered as follows. The assembly was first dried for 2 hours in an atmosphere comprising of helium and 3 percent chlorine at 1100° C., followed by down driving at 5 mm/min through a hot zone set at 1500° C. in a 100% helium (by volume) atmosphere in order to sinter the soot so as to produce preform comprising germania containing void-free silica core, silica $SO_2$-seeded ring (i.e. silica with voids containing $SO_2$), and void-free overclad. The resultant optical fiber preform was placed for 24 hours in an argon purged holding oven set at 1000° C. to outgas any remaining helium from the preform. Finally, the optical fiber preform was drawn to 5 km lengths of 125 micron diameter optical fiber and coated with the low index polymer as described above.

Figure 3B:
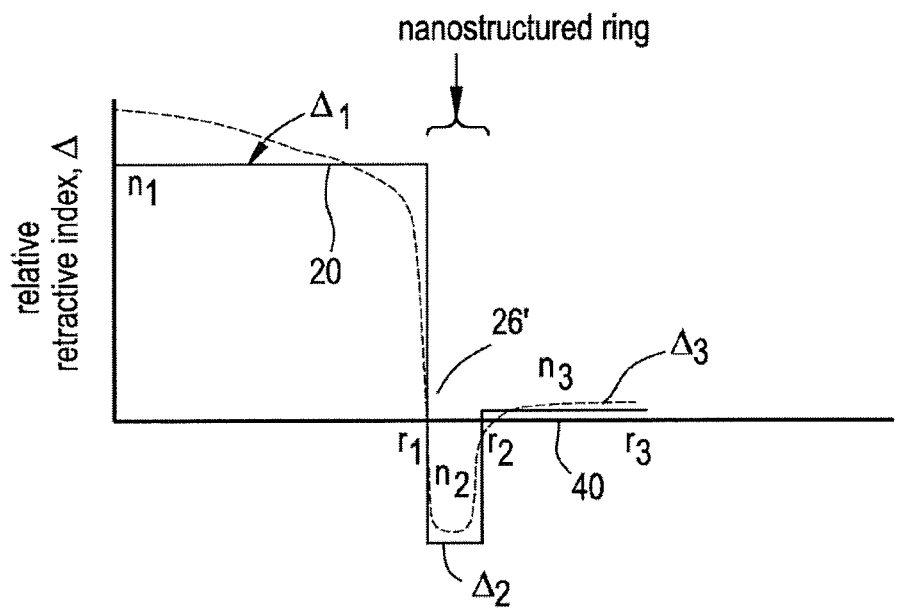
FIG. 3B is a schematic illustration of a relative refractive index plot versus the fiber radius for another exemplary embodiment of the light-diffusing optical fiber.

FIG. 3B illustrates schematically yet another exemplary embodiment of an index profile for fiber 12. The fiber 12 of FIG. 3B includes a core 20 with a relative refractive index $\Delta_1$, a nano-structured region 26' situated over and surrounding the core 20. The core 20 may have a "step" index profile, or a graded core profile, with α-profile having, for example, α-value between 1.8 and 2.3.

In this exemplary embodiment (see FIG. 3B) the nano-structured region 26' is an annular ring with a plurality of voids 32. In this embodiment, the width of region 26' can be as small as 1-2 um, and may have a negative average relative refractive index $\Delta_2$. Cladding 40 surrounds the nano-structured region 26'. The (radial) width of cladding 40 may be as small as 1 µm, and the cladding may have either a negative, a positive or 0% relative refractive index, (relative to pure silica).

The main difference between examples in FIGS. 3A and 3B is that nano-structured region in shown in FIG. 3A is located in the core 20 and in FIG. 3B it is located at the core/clad interface. The depressed-index annular portion 26' begins where the relative refractive index of the core first reaches a value of less than −0.05%, going radially outwardly from the centerline. In the embodiment of FIG. 3B, the cladding 40 has a relative refractive index profile $\Delta 3(r)$ having a maximum absolute magnitude less than 0.1%, and in this embodiment $\Delta 3_{MAX}<0.05\%$ and $\Delta 3_{MIN}>-0.05\%$, and the depressed-index annular portion 26 ends where the outmost void occurs in the void-filled region.

In the embodiment shown in FIG. 3B the index of refraction of the core 20 is greater than the index of refraction n2 of the annular region 26', and the index of refraction n1 of the cladding 40 is also greater than the index of refraction n2.

Figure 3C:
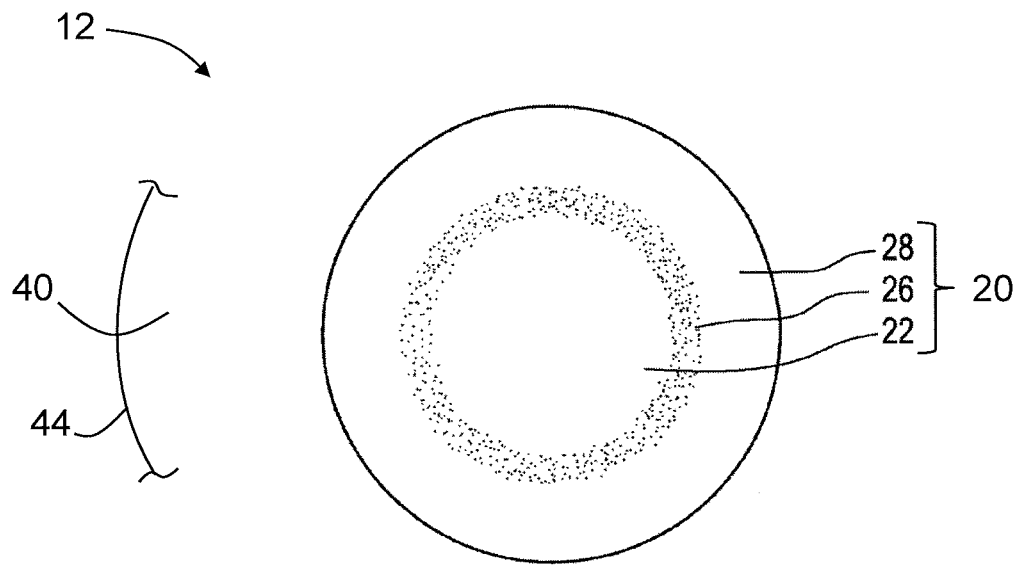
FIG. 3C is illustrates another exemplary embodiment of the light-diffusing optical fiber.

FIG. 3C is a schematic cross-sectional view of an example fiber 12 representative of an actual fiber that was fabricated. With reference also to FIG. 2, fiber 12 of FIG. 3C has a first core region 22 with an outer radius R1 of about 33.4 µm, a nano-structured region 26 with an outer radius R2=42.8 µm, a third core region 28 with an outer radius R3=62.5 µm, and a polymer cladding 40 with an outer radius R4 (not shown) of 82.5 µm). In this embodiment, the material of the core was pure silica (undoped silica), the material for cladding was low index polymer (e.g., UV curable silicone having a refractive index of 1.413 available from Dow-Corning of Midland, Mich. under product name Q3-6696) which, in conjunction with the glass core, resulted in fiber NA of 0.3. The optical fiber 12 had a relatively flat (weak) dependence on wavelength, compared to standard single-mode transmission fiber, such as for example SMF-28e$^R$ fiber, as represented in FIG. 4B. In standard single mode fiber (such as SMF-28$^R$) or multimode optical fibers, the losses at wavelengths less than 1300 nm are dominated by Rayleigh scattering. These Rayleigh scattering losses are determined by the properties of the material and are typically about 20 dB/km for visible wavelengths (400-700 nm). The wavelength dependence of Rayleigh scattering losses is proportional to $\lambda^{-P}$ with p≈4. The exponent of the wavelength dependent scattering losses in the fiber comprising at least one nanostructured region is less than 2, preferably less than 1 over at least 80% (for example greater than 90%) in the 400 nm-1100 nm wavelength range. The average spectral attenuation from 400 nm to 1100 nm was about 0.4 dB/m when the fiber was drawn with at 40 g tension and was about 0.1 dB/m when the fiber 12 was drawn at 90 g tension. In this embodiment, the nano-sized structures contain $SO_2$ gas. Applicants found that filled $SO_2$ voids in the nano-structured ring greatly contribute to scattering. Furthermore, when $SO_2$ gas was used to form the nano-structures, it has been discovered that this gas allows a thermally reversible loss to be obtained, i.e., below 600° C. the nano-structured fiber scatters light, but above 600° C. the same fiber will guide light. This unique behavior that $SO_2$ imparts is also reversible, in that upon cooling the same fiber below 600° C., the fiber 12 will act as light-diffusing optical fiber and will again generate an observable scattering effect.

In certain embodiments, the uniformity of illumination along the fiber length is controlled such that the minimum scattering illumination intensity is not less than 0.7 of the maximum scattering illumination intensity, by controlling fiber tension during the draw process; or by selecting the appropriate draw tension (e.g., between 30 g and 100 g, or between 40 g and 90 g).

Accordingly, according to some embodiments, a method of making fiber 12 to control uniformity of illumination along the fiber length wherein the minimum scattering illumination intensity is not less than 0.7 the maximum scattering illumination intensity includes the step of controlling fiber tension during draw process.

The presence of the nano-sized structures 32 in fiber 12 (see FIG. 2) creates losses due to optical scattering, and the light scattering through the outer surface of the fiber can be used for illumination purposes. FIG. 4A is a plot of the attenuation (loss) in dB/m versus wavelength (nm) for the fiber of FIG. 3C (fiber with $SO_2$ gas filled voids). FIG. 4A illustrates that (i) fibers 12 can achieve very large scattering losses (and thus can provide high illumination intensity) in the visible wavelength range. The scattering losses of fiber 12 also have weak wavelength dependence ($L_s$ is proportional to $1/\lambda^{-P}$, where p is less than 2, preferably less than 1, and even more preferably less than 0.5), as compared to regular 125 µm graded index core multi mode comparative fiber A (fiber A is a step index multimode fiber without the nano-structured region) which has Rayleigh scattering losses of about 0.02 dB/m in the visible wavelength range, or about 20 dB/km at the wavelength of 500 nm and relatively strong wavelength dependence of $1/\lambda^4$. The effect of the tension for the fibers 12 is also illustrated in FIGS. 4A-4B. More specifically FIGS. 4A-4B illustrate that the higher fiber draw tension results in lower scattering losses, and that lower fiber draw tension results in a fiber section with higher scattering loss, i.e., stronger illumination.

FIG. 4A depicts attenuation as function of wavelength for fiber 12 (with voids in the core) drawn at different fiber tensions of 90 and 400 g. FIG. 4B depicts attenuation as function of wavelength for different light-diffusing optical fiber 12 (with voids in the core) drawn at different fiber tension, 90 and 40 g, a comparative multi mode fiber (fiber A) with normalized loss, and a theoretical fiber with $1/\lambda$, loss dependence. Note, the graph of FIG. 4B describes wavelength dependence of the loss. In this example, in order to compare the slope of the scattering for fiber 12 and fiber A, the loss of low-loss fiber (fiber A) was multiplied by a factor of 20, so that the two plots can be easily shown on the same figure.

Without being bound to any particular theory, it is believed that the increase in the scattering losses when the draw tension decreases, for example from 90 g to 40 g, is due to an increase in the average diameter of the nanostructures. Therefore, this effect of fiber tension could be used to produce constant attenuation (illumination intensity) along the length of the fiber by varying the fiber tension during the draw process. For example, a first fiber segment drawn at high tension, T1, with a loss of $\alpha_1$ dB/m and length, L1, will attenuate the optical power from an input level P0 to P0 $\exp(-\alpha_1 * L1/4.343)$. A second fiber segment optically coupled to the first fiber segment and drawn at lower tension T2 with a loss of $\alpha_2$ dB/m and length L2 will further attenuate the optical power from P0 $\exp(-\alpha_1 * L1/4.343)$ to P0 $\exp(-\alpha_1 * L1/4.343) \exp(-\alpha_2 * L2/4.343)$. The lengths and attenuations of the first and second fiber segments can be adjusted to provide uniform intensity along the length of the concatenated fiber.

Figure 5:
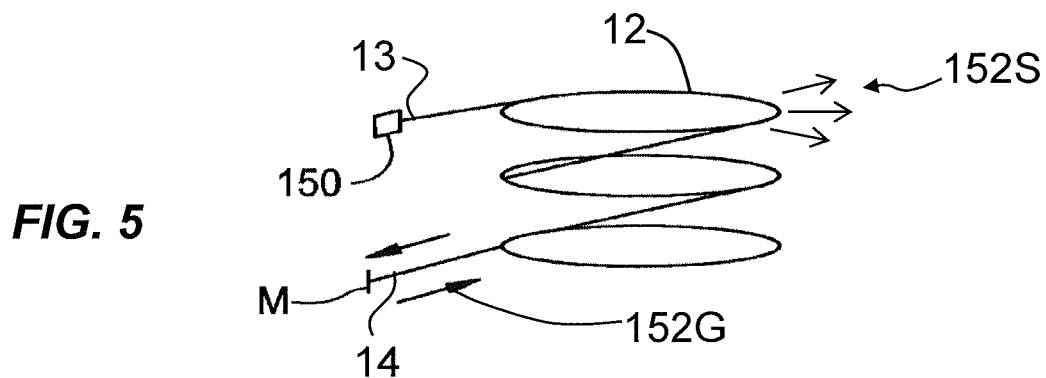
FIG. 5 illustrates a fiber deployment that utilizes two light passes within a single fiber.
Figure 6A:
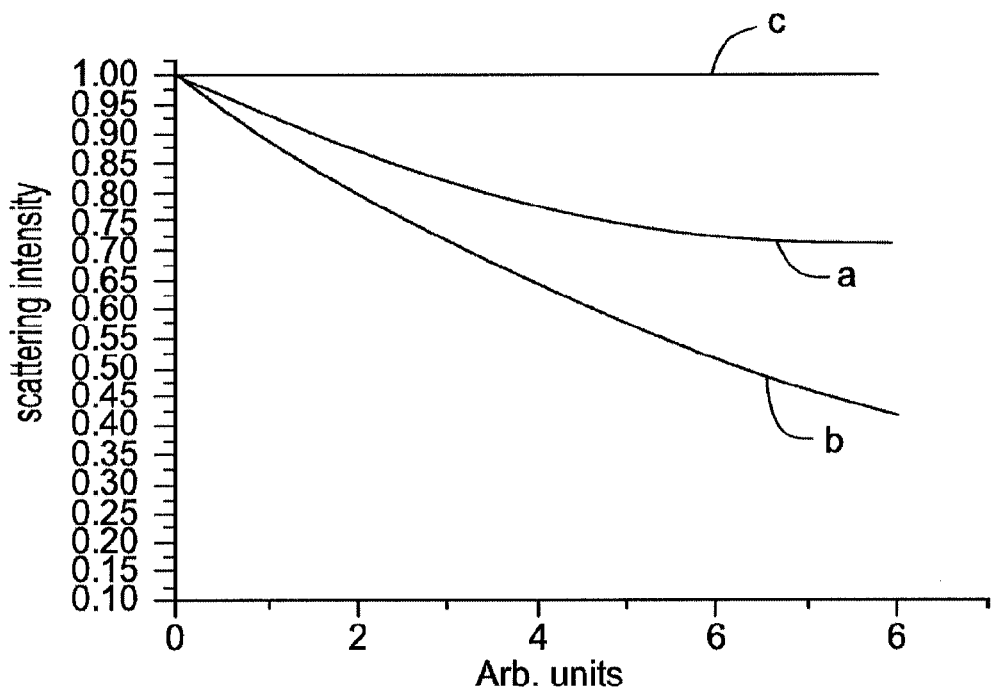
FIG. 6A is a plot of scattering intensity (normalized) versus fiber length (arbitrary units) and illustrates the intensity distribution along the length of the light-diffusing optical fiber when the fiber is made with uniform tension (example a) and variable tension (example b)

One of the advantages of fibers 12 is their ability to provide uniform illumination along its length. FIG. 5 illustrates the arrangement of fiber 12 that results in uniform illumination along the length of the fiber and that utilizes two passes of guided light 152 from a light source 150. In this arrangement, a mirror M is placed at an end 14 of fiber 12. The input light 152 provided by the light source 150 to the light-diffusing optical fiber 12 at an input end 13 propagates in fiber 12 as guided light 152. The portion of guided light 152 that is not scattered out of fiber 12 as scattered light 152S (only some of this scattered light is shown in FIG. 5 for ease of illustration) is reflected by the mirror M and propagates back along the axis of the fiber 12 towards fiber end 13. If the attenuation and length of the fiber 12 are chosen properly, the light output power provided back to the light source is less than a 2%-5% percent of the original light power. The scattering loss intensity for fiber with constant loss distribution (see FIG. 4A) may be higher in the beginning of the fiber and weaker at the end of the fiber. However, if fiber 12 is drawn with a periodically controlled tension (the tension value is related to the furnace temperature, which may vary from 1800° C. to 2100° C.) such that the scattering losses are lower at the beginning of the fiber, where the intensity is high, and higher at the end, where the intensity is lower, the resulting scattering intensity can be made less variable, or constant (for example, as shown in FIG. 6A, example C). The fiber draw tension may be controlled and varied, for example, between 40 g and 400 g, thus providing a wide range of scattering-induced attenuation (e.g., up to 6 times). The mirror M in FIG. 5 may also be replaced by a second light source with power density output that similar to that of the first light source (within a factor of 2, i.e., in the range of 50% to 200%) to not only create a more uniform illumination, but also to increase the quantity of light scattered by the fiber.

Figure 6B:
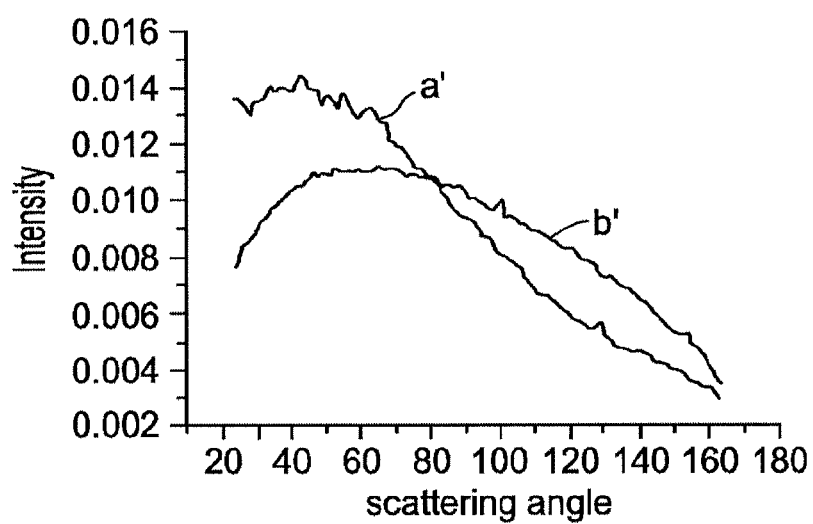
FIG. 6B is a plot of intensity (relative units) vs. scattering angle (degrees) and illustrates the scattering distribution function with white ink (curve b') and without ink (curve a')

One aspect of an exemplary embodiment of the illumination systems described herein is that the angular distribution of the scattering light intensity is uniform or nearly uniform in angular space. The light scattering axially from the surface of the fiber has a variation relative to the mean scattering intensity that is less than 50%, preferably less than 30%, preferably less than 20% and more preferably less than 10%. The dominant scattering mechanism in conventional silicα-based optical fibers without nano-sized structures is Rayleigh scattering, which has a broad angular distribution. Fibers 12 in which there are additional scattering losses due to voids in nano-structured ring may have a strong forward component, as shown in FIG. 6A (embodiments a and b) and FIG. 6B (embodiment a'). This distribution, however, can be corrected by placing a scattering material on the top of coating of the light-diffusing optical fiber 12. Fibers 12 made with coating containing $TiO_2$ based white ink (see FIG. 6B, embodiment b') provide an angular distribution of scattered light that is significantly less forward biased. With an additional thicker layer of $TiO_2$ ink (e.g., 1-5 μm) it is possible to further reduce the forward scattering component, thereby increasing the uniformity of the angular intensity distribution.

Figure 7:
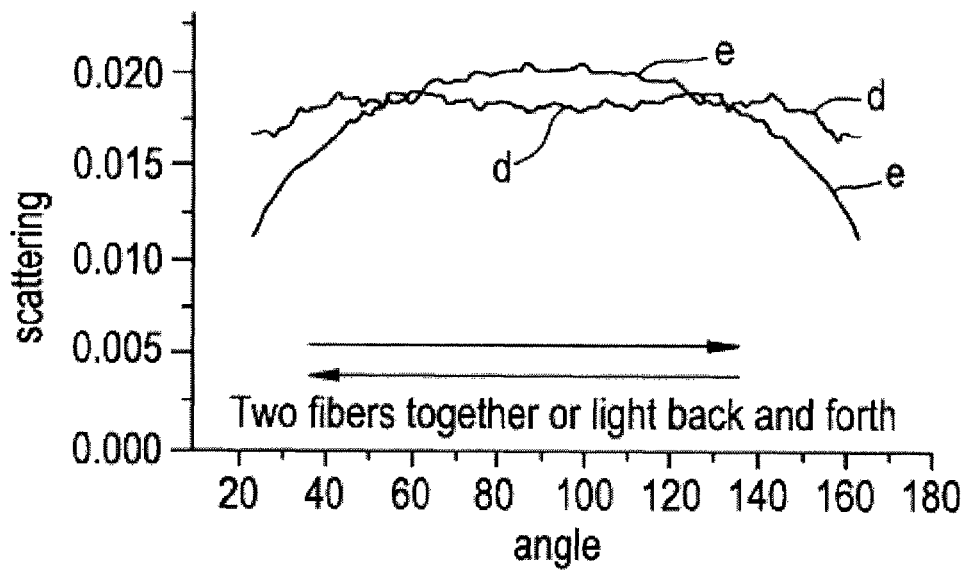
FIG. 7 plots the amount of light scattering (relative units) as a function of scattering angle (degrees) and illustrates the scattering properties for an example illumination system configuration as shown in FIG. 5, with a reflective mirror coupled to an end of the fiber, and with a white-ink coating on the fiber.

FIG. 7 plots the amount of light scattering (relative units) versus scattering angle for an example illuminator system with light-diffusing optical fiber(s) 12 optically coupled to a back reflective mirror M or alternatively topan additional light source 150 (see, e.g., FIG. 5). Even if the fiber has no $TiO_2$ based white-ink coating layer, this configuration provides a relatively flat (i.e., very uniform) angular scattering intensity (see FIG. 6A). In some embodiments, a controlled variation of the ink coating (either thickness of the ink coating or variation of ink concentration in the coating) along the length of the fiber will provide an additional way of making more uniform variation in the intensity of the light scattered form the fiber at large angles (more than 15 degrees).

In some embodiments the ink can be a fluorescent material that converts scattered light to a longer wavelength of light. In some embodiments white light can be emitted (diffused out of the outer surface) by the fiber 12 by coupling the light-diffusing optical fiber 12 with such a coating to a UV light source, for example a 405 nm or 445 nm diode laser. The angular distribution of fluorescence white light in the exemplary embodiments is substantially uniform (e.g., 25% to 400%, preferably 50% to 200%, even more preferably 50% to 150%, or 70% to 130%, or 80% to 120% in angular space).

Lighting System Configuration

Efficient coupling to low-cost light sources 150 such as light emitting diodes (LEDs) or sunlight requires the fiber 12 to have a high NA and large core diameter. With a design similar to that shown in FIG. 2 the size of the multimode core 20 can be maximized, and may have a radius up to 500 μm. The cladding thickness may be much smaller, for example, about 15-30 μm (e.g., about 20 μm). For example, according to one embodiment, a plurality of light-diffusing optical fibers 12 may be wound around a support structure, and each light-diffusing optical fiber may be optically coupled to either the light source or a plurality of light sources. The plurality of fibers 12 can be bundled together in at least one of: a ribbon, ribbon stack, or a round bundle. The fiber bundles or ribbons (i.e., collections of multiple fibers) can also be arranged in the shape of the light source in order to increase coupling efficiency. A typical bundle/ribbon structure can include, for example, 2-36 fibers 12, or may include up to several hundred fibers 12. Cable designs which are assemblies of multiple fibers are well known and could include ribbons, collections of multiple ribbons, or fibers gathered into a tube. Such fibers may include one or more light-diffusing optical fibers 12.

Single Fibers

A bright continuous light source 150 coupled into a fiber 12 can be utilized as an illumination system for different application such as signs, or display illumination, or performing photoreactions, as described below.

Figure 8A:
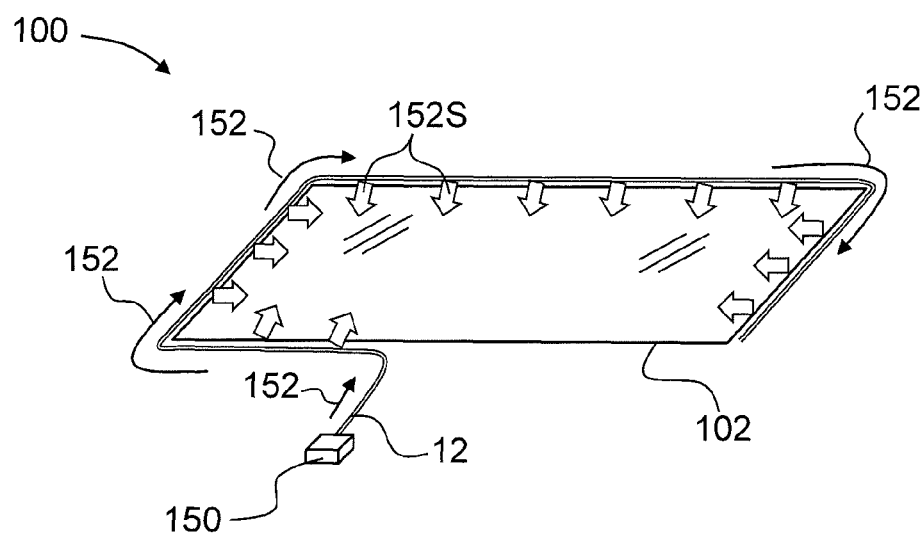
FIG. 8A is a schematic diagram of an exemplary embodiment of an illumination system in the form of a lighting fixture according to the disclosure.

If the illumination system utilizes a single fiber 12 with core diameter of 125-300 μm, a multimode laser diode could be used as a light source 150 for providing light to fiber 12. An exemplary illumination system 100 in the form of a lighting fixture that provides a bright perimeter illuminator for a display screen 102 using a single fiber 12 with a reflective coating directing scattered light 152S in one direction is shown in the schematic diagram of FIG. 8A. According to some embodiments, single or multiple fiber illumination with the fiber(s) 12 can be utilized in aqueous environments, for example for lighting boat docks, fishing lines or lures, and related applications where the small flexible size of the fiber 12 and the ability to be safely immersed in water are highly desirable. The fiber 12 may also be useful for exit lighting, illuminating pathways, emitting IR radiation for room detectors, or used a thread in clothing, particularly protective/ reflective clothing to further enhance visibility of the wearer. Examples of the use of fiber 12 in decorative illumination are manifold, but a few examples include appliance lighting and edge effects, automotive/aircraft illumination, household illumination and furniture illumination.

Figure 8B:
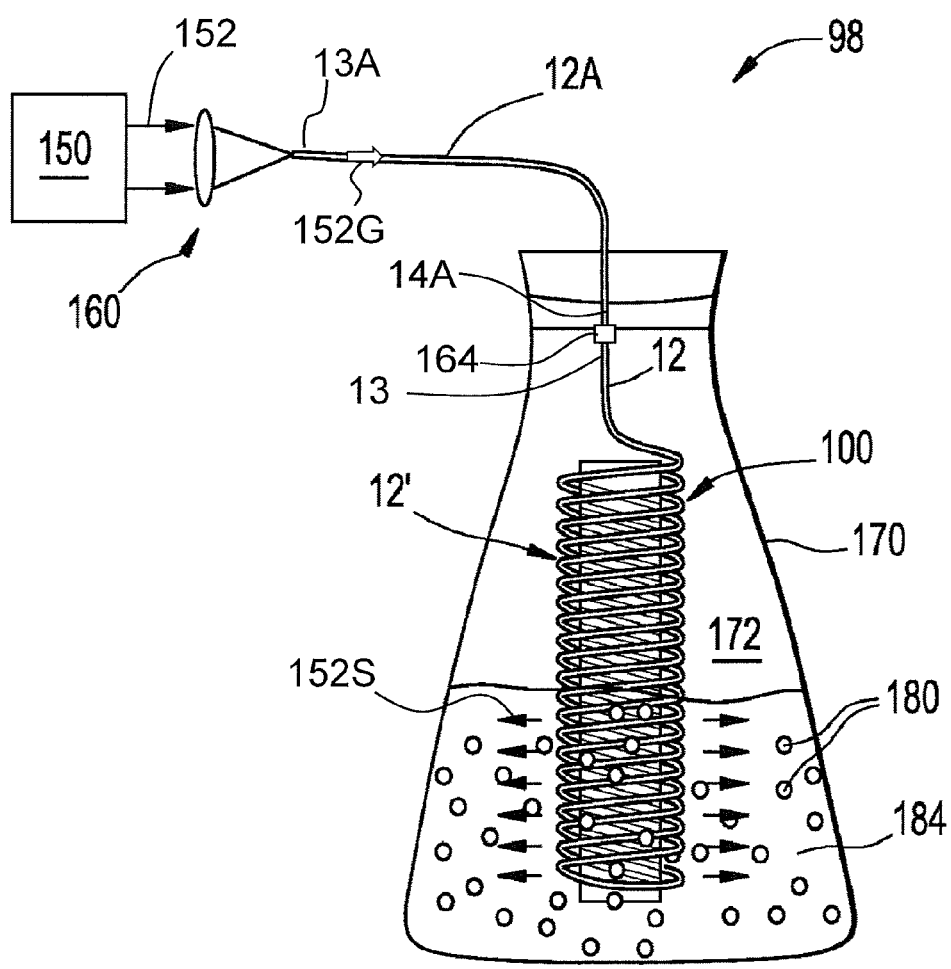
FIG. 8B illustrates an example embodiment of an illumination system as used in combination with a biological chamber in the form of a flask, where the biological material in the chamber can be considered a photochemical substance.

FIG. 8B illustrates an example embodiment of a biological growth system 98 and an example illumination system 100 as used in the biological growth system, wherein biological chamber 170 is in the form of a flask with an interior 172. The light source 150 and an optical coupling system 160 are configured to couple light 152 from the light source into an input end 13A of a low-scatter, light-conducting optical fiber 12A. The low-scatter, light-conducting optical fiber 12A has an output end 14A optically coupled to the input end 13 of fiber 12, e.g., using a splicing member 164. In illumination system 100, fiber 12 serves as a secondary light source and is also referred to below as the light-source fiber.

In the embodiment of FIG. 8B, the light-source fiber 12 is formed from a single counter-wound fiber. It is noted that the light-source fiber 12 can wound around a support structure to form a light-source fiber portion where guided light is scattered from the fiber outer surface to form an extended light source that emits substantially uniform radiation. The bends in the light-source fiber portion are formed to enhance the amount of scattering in fiber 12. Counter-winding at least one fiber can increase the uniformity of the radiation by compensating for the effects of decreasing emitted radiation along the length of the light-source fiber portion. Multiple fibers 12 can be wound in sequence around a support structure, with each fiber coupled to the light source, can be used to form a lengthy extended source. The fiber 12 can be configured to suit a variety of biological chamber geometries and provides light to the biological material growth of biological material 180. The biological material 180 may be, for example, algae (e.g., algae colonies, algae blooms) or bacteria (e.g., cyanobacteria). In an example embodiment, biological material 180 may be suspended in a support medium 184 such as water. Biological material 180 constitutes a type of photoreactive material 270, as discussed in greater detail below.

Coatings

In an example embodiment, fiber 12 may include a coating 44 as discussed above in connection with FIG. 2 and also as discussed in connection with FIG. 24, below. In one exemplary embodiment, coating 44 includes a hydrophilic coating layer such as a UV-cured acrylate coating that provides improved wet adhesion. The coating layer may include UV curable coatings comprising a low modulus primary coating layer (typically <3 MPa) adjacent the glass and a higher-modulus secondary coating layer (typically >50 MPa). The higher modulus secondary coating layer is adjacent and situated over the primary (lower modulus) coating layer.

Other, or additional coatings, applied either as a single layer coating or as a layer in a multi-layer coating may also be utilized in forming coating 44. Examples of such materials are a hydrophilic coating, which serves as a cell growth medium, or a coating containing a material to provide additional scattering to the escaped light. These coatings may also serve as a protective covering for the fiber 12.

Exemplary hydrophilic coatings for use in coating 44 are those commonly used for improving cell adhesion and growth to surfaces and contain carboxylic acid functionality and amine functionality (e.g. formulations containing acrylic acid or acrylamides). In addition, hydrophilic coatings may be enhanced by serving as a reservoir for nutrients essential for the growth of biological material.

In some exemplary embodiments, coating 44 includes fluorescent or ultraviolet absorbing molecules that serve to modify scattered light 152S. Suitable up or down converter molecules may also be included in the coating to produce light of differing wavelengths from that of the input light source. Ink coating layers may also be applied to alter the color or hue of the emitted light. Other coating embodiments include molecules capable of providing additional scattering to the light emitted from the fiber. A further embodiment may be the inclusion of photo-active catalysts onto the coating that may be used to increase the rate of photo-reactions. One example of just such a catalyst is rutile $TiO_2$, which can serve as a photo-catalyst.

According to some embodiments, fibers 12 may be enclosed within a polymeric, metal, or glass covering (or coatings) 44, wherein said the coating or covering has a minimum outer dimension (e.g., diameter) greater than 250 μm. If the fiber(s) has a metal coating, the metal coating may contain open sections, to allow light to be preferentially directed into a given area. These additional coatings or coverings may also contain additional compounds to vary the emitted light or catalyze reactions in the same manner as described above for the coatings coated on the fiber.

As stated above, fiber 12 may comprise a hydrophilic coating disposed on the outer surface of the fiber as part of coating 44 or as coating 44. Also, fluorescent species (e.g., ultraviolet-absorbing material) may be disposed in the optical fiber coating 44, as well as molecules capable of providing additional scattering of the emitted light. According to some embodiments, the light source 150 coupled to fiber 12 generates light in the 200 nm to 500 nm wavelength range and the fluorescent material (fluorescent species) in the fiber coating 44 generates either white, green, red, or NIR (near infrared) light.

Furthermore, an additional coating layer may be included in layer 44. This layer may be configured to modify scattered light 152S, or alter the interaction of the coating materials. Examples of just such a coating 44 would include materials such as, but not limited to, poly (2-acrylamido-2-methanesulfonic acid), ortho-nitrobenzyl groups, or azobenzene moities respectively.

Exemplary Illumination System Configurations

Some exemplary embodiments of illumination systems 100 and 200 (introduced and discussed below) include: (i) a light source 150 that generates light 152 having at least one wavelength λ, within the 200 nm to 2000 nm range; and (ii) at least one fiber 12. The fiber 12 comprises a glass core, cladding, and a plurality of nano-sized structures 32 situated within the core or at a core-cladding boundary. This fiber 12 further includes an outer surface, and at least one end optically coupled to the light source. As described above, the light-diffusing optical fiber 12 is configured to scatter guided light 152G via the nano-sized structures, such as voids, away from the core and through the outer surface, to form a light-source fiber portion having a length that emits substantially uniform radiation as scattered light 152S over its length. In an embodiment, the light-diffusing optical fiber 12 has a scattering-induced attenuation greater than 50 dB/km for one or more wavelength(s) within the 200 nm to 2000 nm range (e.g. in the 400-700 nm range, or in the 1 μm to 2 μm range).

The fiber 12 may have a plurality of bends formed therein to preferentially form, via the nano-sized structures 32, scattered light 152S that travels away from the core 20 and through the outer surface 48 within specified area(s). Preferably, the deviation of the illumination intensity of scattered light 152S is less than 30% of the maximum scattering illumination intensity along the length.

According to some embodiments the scattering-induced attenuation is between 100 dB/km and 6000 dB/km, or higher. In some embodiments, attenuation due to scattering is 6000 dB/km to 60000 dB/km for the one or more wavelength (s) situated within 200 nm to 2000 nm range. According to some embodiments fiber 12 has a length between 0.5 m and 100 m and the scattering-induced attenuation is between 300 dB/km and 5000 dB/km for the one or more wavelength(s) situated within 200 nm to 2000 nm range, and/or is greater than 3 dB/length of fiber.

In other embodiments, the fiber 12 has a length between 0.1 m and 0.5 m and the scattering-induced attenuation is between 5000 dB/km and 60000 dB/km for the one or more wavelength(s) situated within 200 nm to 2000 nm range. Preferably, the nano-sized structures 32 are gas filled voids (e.g., $SO_2$ filled voids) with diameter of greater than 10 nm, preferably greater than 50 nm, more preferably greater than 100 nm. Preferably the fiber cladding 40 is either glass, or polymer, and is at least 20 μm thick. The cladding, in combination with said core 20, provides a NA of 0.2 or greater. As described above, uniformity of illumination along the fiber length (with about 30% from maximum intensity, and preferably within about 20% from maximum intensity, and more preferably within about 10% from maximum intensity) can be accomplished by controlling the fiber tension during the draw process. As previously discussed, the uniformity of the illumination from scattered light 152S can be further reduced by utilizing a reflector M coupled to the end of the fiber 12 that is opposite to the end of the fiber coupled to the light source 150.

Thus, according to some embodiments, the light-diffusing optical fiber 12 includes a glass core 20 at least partially filled with nanostructures 32 for scattering light, a cladding 40 surrounding the core, and at least one coating 44 surrounding the cladding. For example, the core and cladding may be surrounded by a primary and secondary coating layers that make up coating 44, and/or by an ink layer. In some embodiments the ink layer contains pigments to provide additional absorption and modify the spectrum of scattered light 152S (e.g., to provide additional color(s) to the diffused light). In other embodiments, one or more of the coating layers comprises molecules that convert the wavelength of the light propagating through the fiber core such that the light emanating from the fiber coating (light diffused by the fiber) is at a different wavelength.

In some embodiments the ink layer and/or the coating layer 44 may comprise phosphor in order to convert the scattered light 152S from the core into light of differing wavelength(s). In some embodiments, the phosphor and/or pigments are dispersed in the primary coating. In some embodiments the pigments are dispersed in the secondary coating, in some embodiments the pigments are dispersed in the primary and secondary coatings. In some embodiments the phosphor and/or pigments are dispersed in the polymeric cladding. Preferably, the nanostructures are voids filled $SO_2$.

According to some embodiments, fiber 12 includes a primary coating, an optional secondary coating surrounding the primary coating and/or an ink layer (for example located directly on the cladding, or on one of the coatings. The primary and/or the secondary coating may comprise at leas one of: pigment, phosphors, fluorescent material, UV absorbing material, hydrophilic material, light modifying material, or a combination thereof.

The plurality of light-diffusing optical fibers 12 can be bundled together in at least one of: a ribbon, ribbon stack, or a round bundle. The fiber bundles or ribbons (i.e., collections of multiple fibers) can also be arranged in the shape of the light source in order to increase coupling efficiency. A typical bundle/ribbon structure can include, for example 2 to 36 light-diffusing optical fibers 12, or, with overstacking of fibers, may include up to several hundreds of fibers 12.

As stated above, fiber 12 may comprise a hydrophilic coating 44 disposed on the outer surface of the optical fiber. Alternatively, a hydrophilic coating may be disposed on the outer surface of the fiber ribbon. A ribbon may also be arranged in the shape of the light source, to provide better coupling between the light-diffusing optical fibers 12 and the light source. An advantage derived from the ribbon structure is that winding of the individual fibers may not be necessary, because the ribbons may form bent structures such as waves, helices, or spirals thereby allowing light to scatter into desired areas. Furthermore, the use of multi-fiber ribbons affords the possibility of having large stacks of ribbons. Such ribbon stacks would provide a more concentrated amount of light, and also open the possibility to the use of different light sources, such as red lasers, sunlight, light emitting diodes, or guidance of point light sources. For example, according to one embodiment, a plurality of light-diffusing optical fibers 12 may be optically coupled to either a single light source or a plurality of light sources, while the light-diffusing optical fibers 12 are bundled together in at least one of a ribbon, ribbon stack, or a round bundle. Furthermore the bundles or ribbons of light-diffusing optical fibers 12 may be connected to a light source(s) by a transmission fiber capable of directing the light towards the light-diffusing optical fiber with a minimum of loss. This latter configuration can be expected to be very useful for remote lighting applications where light is gathered from a source distant from the area where light is to be delivered.

According to some embodiments, fiber 12 includes: 1) a core, a cladding, and a plurality of nano-sized structures situated within said core or at a core-cladding boundary, the optical fiber further including an outer surface and is configured to (i) scatter guided light via said nano-sized structures away from the core and through the outer surface, (ii) have a scattering-induced attenuation greater than 50 dB/km at illumination wavelength; and 2) one or more coatings, such that either the cladding or at least one coating includes phosphor or pigments. According to some embodiments these pigments may be capable of altering the wavelength of the light such that the illumination (diffused light) provided by the outer surface of the fiber is of a different wavelength from that of the light propagating through fiber core. Preferably, the nanostructures are voids filled $SO_2$.

According to some embodiments, fiber 12 includes: a core, a cladding, and a plurality of nano-sized structures situated within said core or at a core-cladding boundary. The optical fiber further includes an outer surface and is configured to (i) scatter guided light via said nano-sized structures away from the core and through the outer surface, (ii) have a scattering-induced attenuation greater than 50 dB/km at illumination wavelength; wherein the entire core includes nano-sized structures. Such fiber may optionally include at least one coating, such that either the cladding or at least one coating includes phosphor or pigments. According to some embodiments the nanostructures are voids filled $SO_2$.

According to some embodiments, fiber 12 includes: a core, and a plurality of nano-sized structures situated within said core such that the entire core includes nano-structures, the optical fiber further including an outer surface and is configured to (i) scatter guided light via said nano-sized structures away from the core and through the outer surface, (ii) have a scattering-induced attenuation greater than 50 dB/km at illumination wavelength, wherein the fiber does not include cladding. According to some embodiments the nanostructures are voids filled $SO_2$. The $SO_2$ filled voids in the nano-structured area greatly contribute to scattering (improve scattering).

According to some embodiments, fiber 12 includes: a core, and a plurality of nano-sized structures situated within said core such that the entire core includes nano-structures, said optical fiber further including an outer surface and is configured to (i) scatter guided light via said nano-sized structures away from the core and through the outer surface, (ii) have a scattering-induced attenuation greater than 50 dB/km at illumination wavelength wherein said fiber does not include cladding. According to some embodiments the fiber includes at least one coating such that either the cladding or the coating includes phosphor or pigments. According to some embodiments the nanostructures are voids filled $SO_2$. As stated above, the $SO_2$ filled voids in the nano-structured area greatly contribute to scattering (improve scattering).

Performing Photoreactions Using Light-Diffusing Optical Fiber

Aspects of the disclosure are directed to performing a photoreaction in a photoreactive material using scattered actinic light 152S from one or more light-diffusing optical fibers 12. This is accomplished by using an illumination system that employs one or more light-diffusing optical fibers 12 operably disposed relative to a photoreactive material so that the scattered actinic light is provided throughout the photoreactive material with sufficient intensity to cause the desired photoreaction. In the description below, light source 150 comprises an actinic light source that generates actinic light 152.

Example photoreactive materials 270 include photochemical substances and photocurable substances. Photocurable substances include photocurable polymers. Photochemical substances include photo-acids, photo-bases, substances where the actinic light causes free-radical reactions, photo-oxidation, photo-reduction or a combination of such reactions.

Figure 9A:
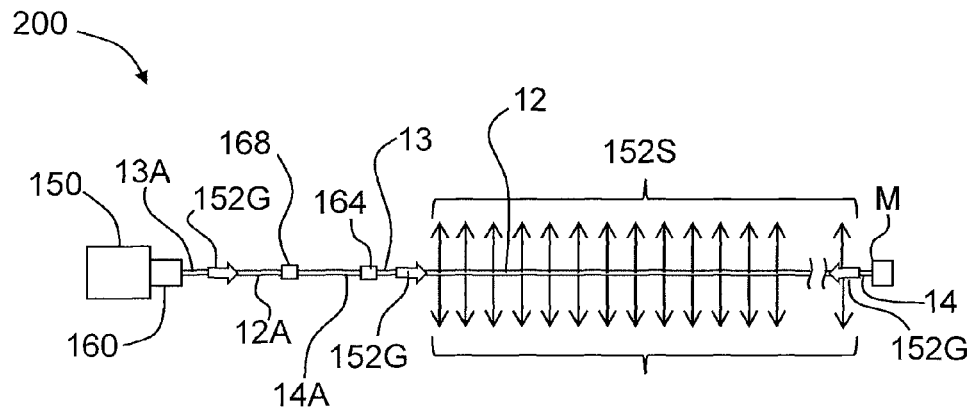
FIG. 9A is a side view of an example illumination system similar to the illumination system of FIG. 8B but with the light-diffusing optical fiber being straight.

FIG. 9A is a side view of an example actinic illumination system 200 similar to the illumination system of FIG. 8B. Low-scatter light-conducting optical fiber 12A is optically coupled to actinic light source 150 at an end 13A via optical coupling system 160, which in an example may be an optical fiber connector. Low-scatter light-conducting optical fiber 12A has an end 14A that is optically coupled to an input end 13 of light-diffusing optical fiber 12 using, for example, a splicing member 164, as shown. Light-diffusing optical fiber 12 also has an end 14 opposite input end 13. Actinic light source 150 emits actinic light 152 that travels in optical fibers 12A and 12 as guided actinic light 152G. Guided actinic light 152G that travels in light-diffusing optical fiber 12 scatters out of the fiber as scattered actinic light 152S. In an example, light source 150 includes, in addition to those sources already mentioned, a mercury lamp, a Xenon lamp or a deuterium lamp that emits UV actinic light suitable for curing UV-photocurable materials or inducing UV photochemical reactions.

Light-diffusing optical fiber 12 can be configured as being wound or coiled as shown in FIG. 8B, or can be configured as any reasonable shape. In an example, mirror M is optically coupled to end 14 of light-diffusing optical fiber 12, such as shown in FIG. 5. In an example, illumination system 200 includes an optical isolator 168 arranged in low-scatter light-conducting optical fiber 12A to prevent scattered actinic light 152S or guided actinic light 152G from returning to light source 150, e.g., by reflection from mirror M.

Figure 9B:
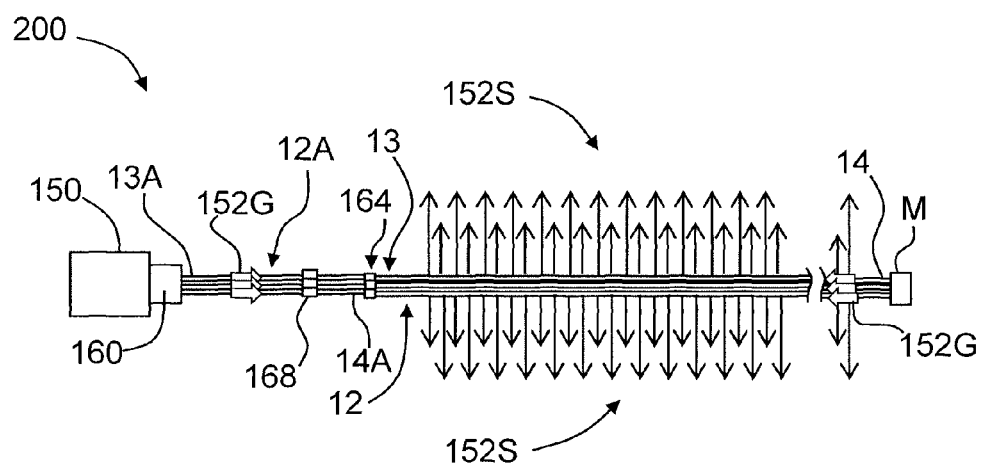
FIG. 9B is similar to FIG. 9A and illustrates an example illumination system having multiple light-diffusing optical fibers.

FIG. 9B is similar to FIG. 9A and shows an example of actinic illumination system 200 that employs multiple low-scatter light-conducting optical fibers 12A optically coupled to respective multiple light-diffusing optical fibers 12.

Figure 10A:
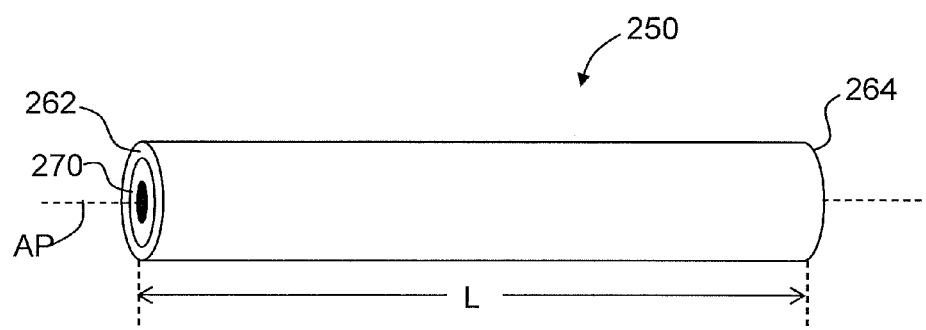
FIG. 10A is a perspective view and FIG. 10B is a cross-sectional view of a container in the form of a pipe that contains photoreactive material disposed within its interior.
Figure 10B:
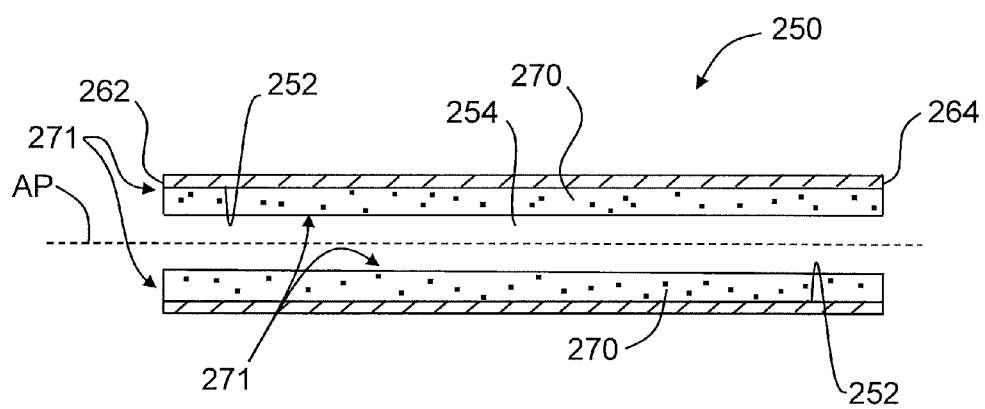
Figure 10C:
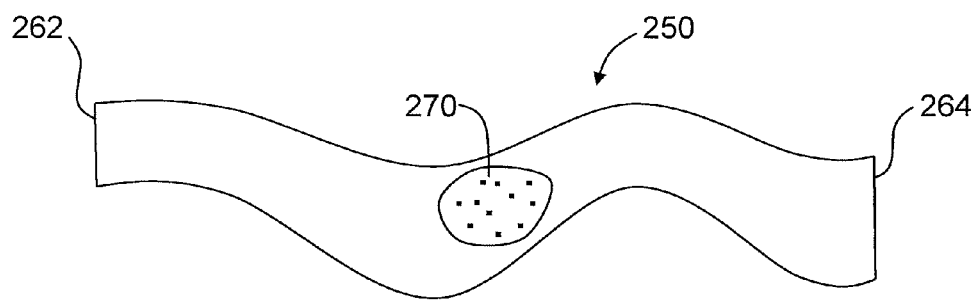
FIG. 10C is a side view of an example of an irregular-shaped container that contains a photoreactive material as illustrated by the cut-away portion.

FIG. 10A is a perspective view and FIG. 10B is a cross-sectional view of a container in the form of a pipe 250 having an interior 254 defined by an interior surface 252. Pipe 250 has a front end 262 and a rear end 264. Pipe 250 has an arbitrary length L and a central axis AP. While pipe 250 is shown as being cylindrical in FIG. 10A and FIG. 10B, it need not be cylindrical and can be curved, tapered, etc., such as the irregular-shaped container 250 shown in FIG. 10C. A photoreactive material 270 is disposed within container (pipe) interior 254, e.g., adjacent interior wall 252. Photoreactive material 270 can partially fill or completely fill interior 254.

An aspect of the disclosure is directed to performing a photoreaction in photoreactive material 270 using scattered actinic light 152S. This aspect of the disclosure is particular useful in situations where the photoreactive material 270 is configured or otherwise disposed such that the entirety of the photoreactive material cannot be photoactivated by exposure to actinic light 152. For example, there are situations wherein the photoreactive material 270 is contained entirely within an opaque structure so that actinic light 152 cannot be received by the photoreactive material directly (i.e., via free-space travel) from actinic light source 150. Likewise, photoreactive material 270 may be contained with an opaque structure wherein the photoreactive material presents one or more surfaces. While such surfaces can be directly irradiated with actinic light 152 from light source 150, the actinic light cannot reach all parts of the photoreactive material, leaving a portion of the photoreactive material inactivated (or un-photoreacted)

Thus, in an example, photoreactive material has one or more surfaces 271 (introduced and discussed below) and is configured such that the entirety of the photoreactive material cannot be photoactivated by free-space exposure to actinic light through the one or more surfaces.

Figure 11:
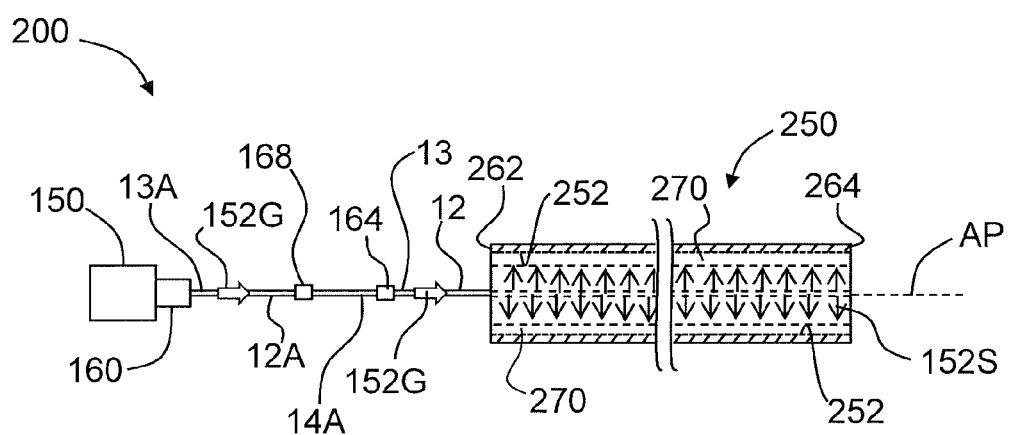
FIG. 11 is a side view of the illumination system of FIG. 9A shown operably arranged with the light-diffusing optical fiber within the pipe interior to perform a photoreaction in the photoreactive material contained therein using scattered actinic light from the light-diffusing optical fiber.

FIG. 11 is a side view of actinic illumination system 200 of FIG. 9A shown with light-diffusing optical fiber 12 operably arranged with an interior 254 of pipe 250 and relative to photoreactive material 270 disposed within the pipe interior. Light-diffusing optical fiber 12 can be inserted into interior 254 of pipe 250, e.g., along pipe axis AP. When actinic light source 150 generates actinic light 152, this light enters and travels through low-scatter light-conducting optical fiber 12A to light-diffusing optical fiber 12 as guided actinic light 152G. Guided actinic light 152G travels within light-diffusing optical fiber 12 and generates scattered actinic light 152S, as described above. This scattered actinic light 152S is incident upon and enters photoreactive material 270 and has sufficient intensity to cause a photoreaction therein, e.g., a photocuring reaction or a photochemical reaction throughout the photoreactive material. Note that actinic light 152 would generally not be able to be directed throughout the entire volume of photoreactive material 270 via free-space exposure from actinic light source 150. Actinic illumination system 200 enables the delivery of actinic light 152 in the form of scattered actinic light from light-diffusing optical fiber 12.

Experiments were performed with an arrangement similar to that shown in FIG. 11 wherein light source 150 was a laser that emitted light 152 at 355 nm with 2.3 W of power at a repetition rate of 30 kHz and a pulse width of about 10 ns. The laser was coupled directly to light-diffusing optical fiber 12 with the coupling efficiency of optical coupler 160 being about 60%. Light-diffusing optical fiber 12 was disposed within an opaque plastic pipe 250 having a length L of about 30 cm. The interior 254 of pipe 250 was substantially entirely filled with a photoreactive material 270 in the form of the photocurable polymer material as described in Example 8 of U.S. Pat. No. 7,256,221, which patent is incorporated by reference herein. The photoreactive material 270 of Example 8 is constituted by: 58.00% Kraton L-207; 8.00% DD-36 Dimer diol; 30.00% TJFS05 silica powder; and 4.00% dispersion of 5% Cyracure 6974 in Kraton L-207. Exposure times ranged from 10 minutes to 60 minutes. In examples, the polymer photoreactive material 270 cured in a range from about 3 mm to 4 mm from the light-diffusing optical fiber 12.

Figure 12:
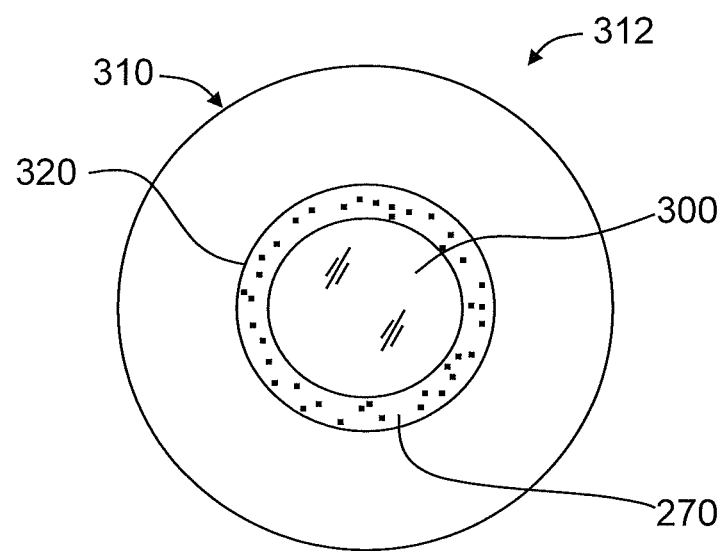
FIG. 12 is a face-on view of a prior art optics mount used to support an optical element by fixing the optical element to the mount with a photoreactive material in the form of a light-curable potting compound.
Figure 13:
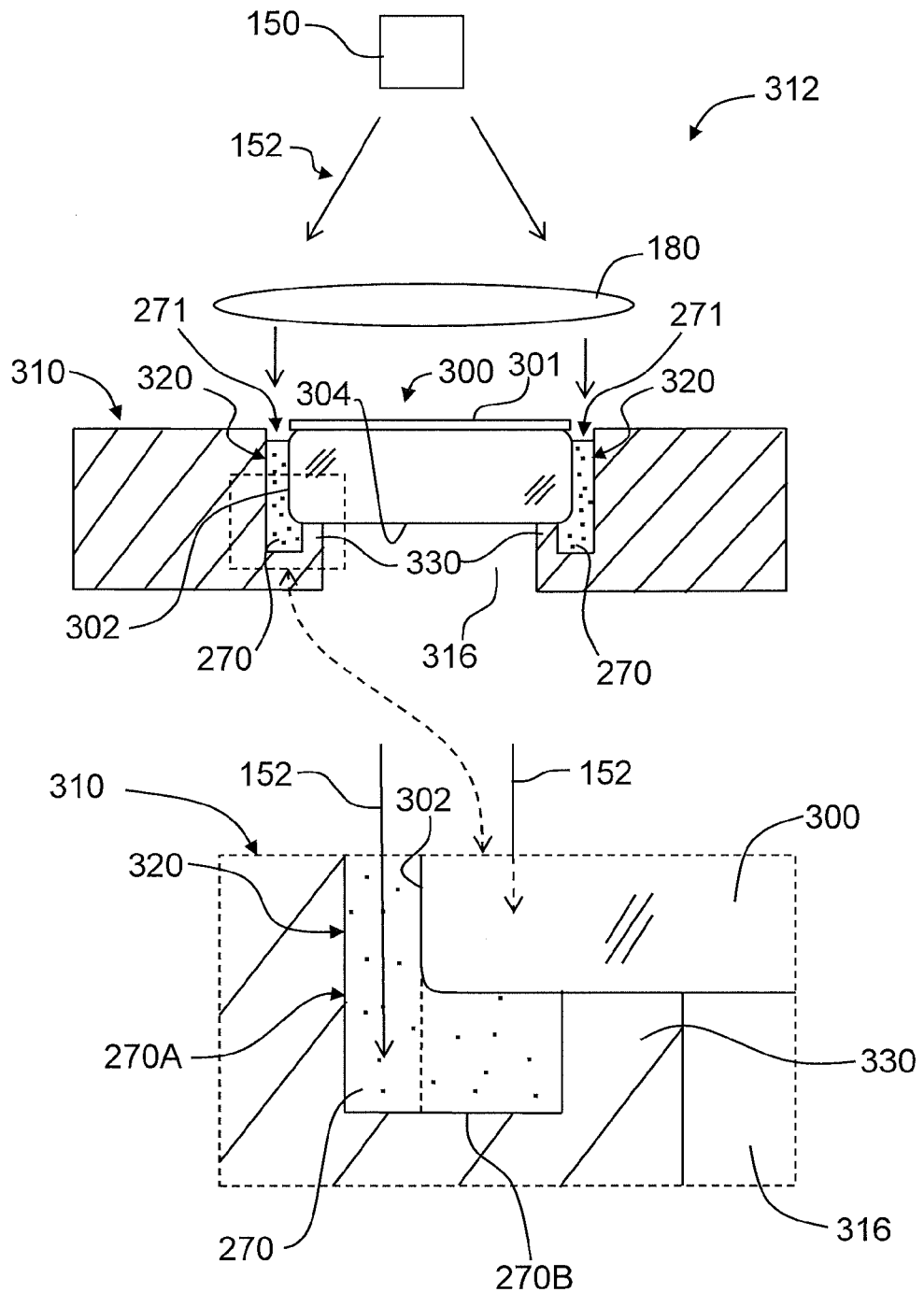
FIG. 13 is a schematic diagram of a prior art method of providing actinic light through free space to the light-curable compound of the prior art optics mount of FIG. 12, illustrating in the close-up inset how the actinic light does not reach throughout the light-curable potting compound.

FIG. 12 is a face-on view of a prior art optical-element mount ("optics mount") 310 used to support an optical element 300. The optics mount 310 and optical element 300 operably supported therein (e.g., fixed thereto) constitute an optical assembly 312. FIG. 13 is a schematic diagram of a prior art optical-element assembly 312 where an actinic light source 150 is used to deliver actinic light 152 via free space to photoreactive material 270 in the form of a light-curable potting compound used to fix optical element 300 in optics mount 310. In an example, optical element 300 is made of glass or plastic, and optics mount 310 is made of a metal. Optical element has a perimeter 302 and a bottom surface 304.

In an example, optical element 300 substantially blocks actinic light 152, e.g., by the presence of a coating 301 designed to transmit light of a select wavelength but that substantially blocks light at the actinic wavelength, or that substantially absorbes actinic light 152. For example, optical element 300 may be configured to transmit light having one wavelength (e.g., a deep UV wavelength of say 193 nm) but not transmit substantial amounts of the actinic wavelength, e.g., UV light having a wavelength of 435 nm or 365 nm.

In an example embodiment, optics mount 310 has central aperture 316 defined by an inner ring 320, which is defined in part by a lip 330 upon which optical element 300 is supported at the lens bottom surface 304 and adjacent lens perimeter 302. Optical element 300 is fixed to optics mount 310 using the aforementioned light-curable potting compound 270 that at least partially fills ring 320 and that contacts at least a portion of lens perimeter 302 and a portion of lens bottom surface 304 adjacent the lens perimeter. Thus, light-curable potting compound 270 is in contact with at least a portion of optical element 300 and is in contact with at least a portion of optics mount 310. Photoreactive material 270 presents a surface 271 upon which actinic light 152 that comes directly from actinic light source 150 via free-space communication can be made incident upon.

The arrangement of FIG. 13 is such that a portion 270A of light-curable potting compound 270 is exposed to actinic radiation 152 through surface 271 while another portion 270B of the light-curable potting compound that resides beneath optical element 300 (i.e., adjacent bottom surface 304) is blocked from being irradiated due to the opaque optical element. As a consequence, the portion 270B of the light-curable potting compound 270 remains uncured so that optical element 300 is not properly fixed to optics mount 310.

Figure 14:
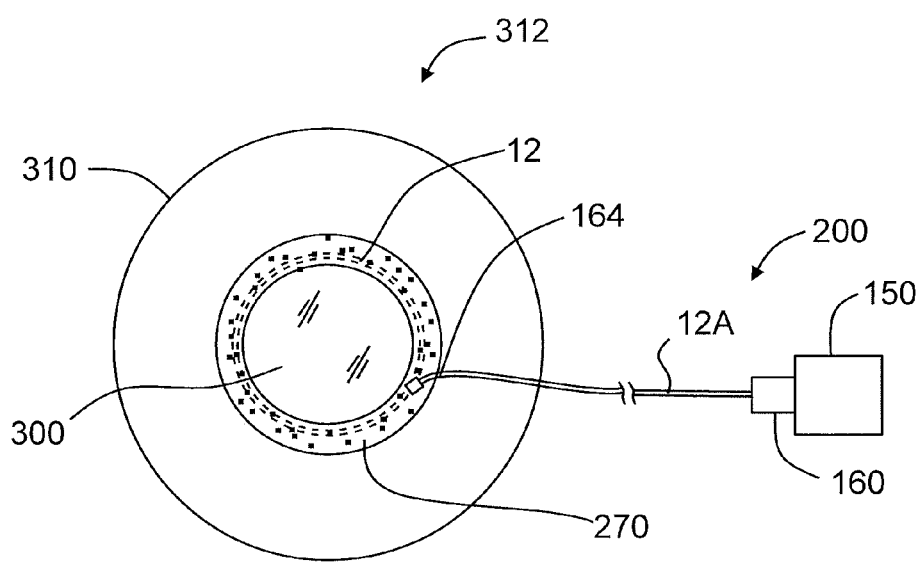
FIG. 14 is similar to FIG. 12 and illustrates an optics mount according to the disclosure that includes a section of light-diffusing optical fiber embedded within the light-curable potting compound and optically coupled to an actinic light source.
Figure 15:
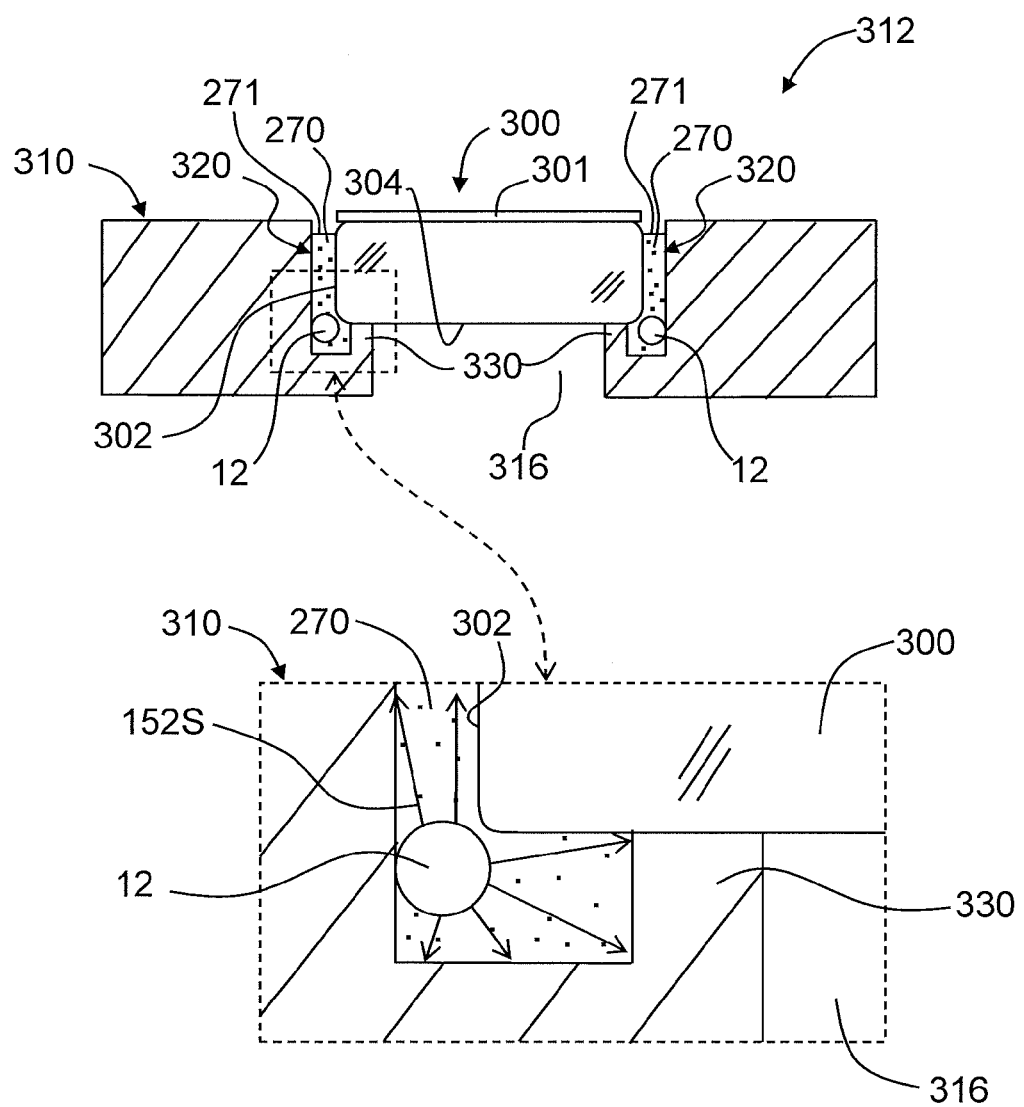
FIG. 15 is similar to FIG. 13 and illustrates how guided actinic light that travels in the light-diffusing optical fiber forms scattered actinic light that reaches throughout the light-curable potting compound.

FIG. 14 is similar to FIG. 12, and FIG. 15 is similar to FIG. 13, with FIGS. 14 and 15 illustrating an embodiment where a section (portion) of light-diffusion optical fiber 12 as part of actinic illumination system 200 is embedded within the light-curable potting compound 270. In the embodiment, the light-curable potting compound is cured by delivering from light-diffusing optical fiber 12 scattered actinic light 152S throughout the UV-curable potting compound residing within ring 320.

As described above, scattered actinic light 152S that reaches throughout the photoreactive material 270 originates as actinic light 152 generated by actinic light source 150 and that travels in the light-diffusing optical fiber 12 as guided actinic light 152G. In another example, a portion of light-diffusing optical fiber 12 is only partially embedded in photoreactive material 270, while in yet another example, a portion of light-diffusing optical fiber is entirely embedded within the photoreactive material, while another portion protrudes from the photoreactive material, e.g., so that it can be optically coupled to low-scatter light-conducting optical fiber 12A or optically coupled directly to actinic light source 150.

In an example, after the photoreaction is performed in photoreactive material 270, light-diffusing optical fiber 12 is separated from low-scatter light-conducting optical fiber 12A at splicing member 164, or is simply cut as close to the photoreactive material as possible, leaving the embedded portion light-diffusing optical fiber 12 to remain embedded with the photoreactive material.

The above system and method for performing a photoreaction in a photoreactive material in the form of a light-curable potting compound used in optics mount 310 has important practical applications. In one example application, one or more optics mounts 310 are used in a DUV optical system such as a DUV illuminator or a DUV imaging lens. Unfortunately, UV light-curable potting compounds can be degraded by exposure to light having DUV wavelengths.

Figure 16:
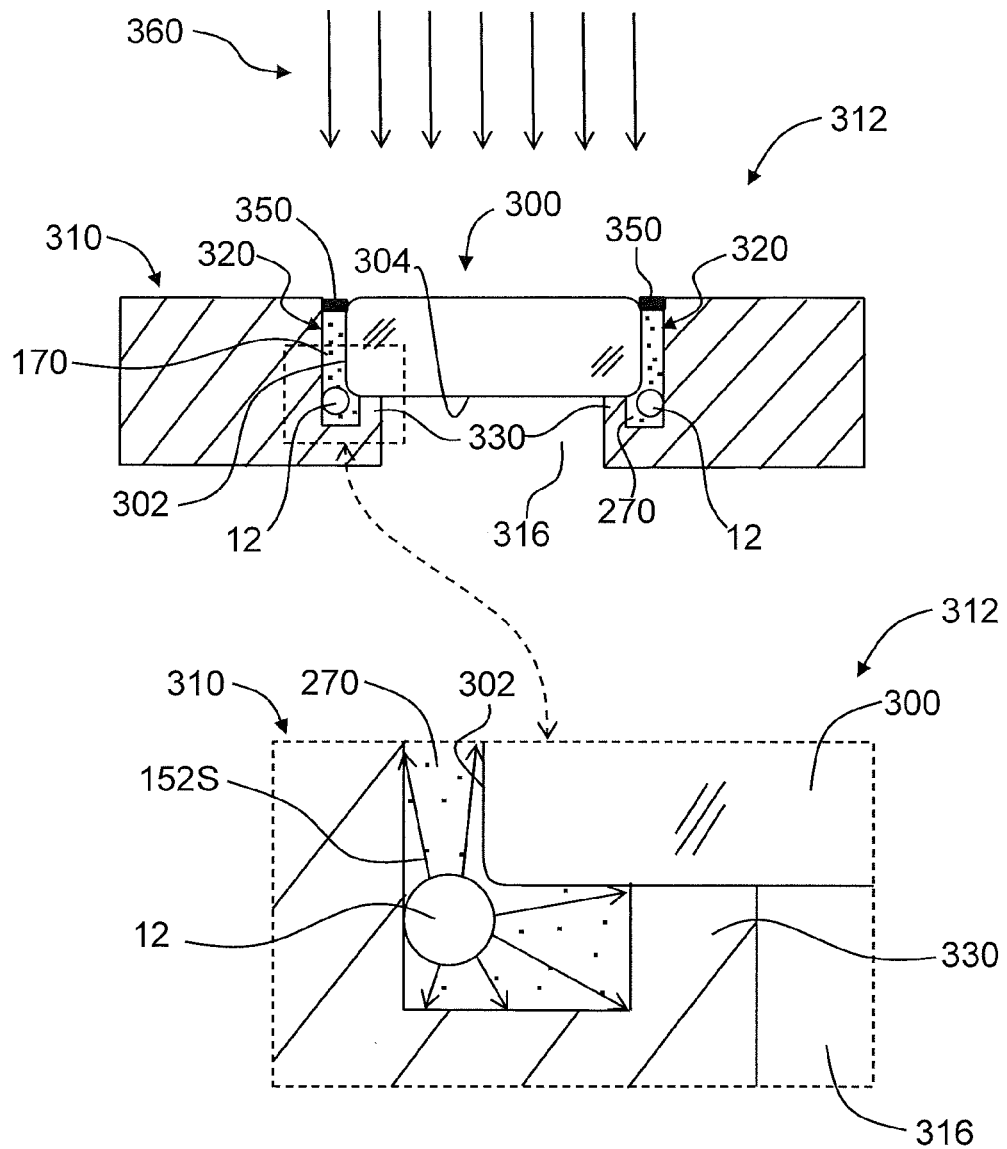
FIG. 16 is similar to FIG. 15 and illustrates an example embodiment of an opaque shield that protects the photoreactive material from light that can cause the photoreactive material to degrade after the photoreaction takes place.

Thus, with reference to FIG. 16, in an example, the UV light-curable potting compound 270 is covered by an opaque shield 350 to prevent DUV degradation of the UV light-curable potting compound 270 by DUV light 360 after curing with scattered actinic light 152S. Opaque shield 350 may be in the form of a coating, a layer, a solid member, or the like, and in the instant example has an annular shape that corresponds to the exposed surface 271 of the UV light-curable potting compound.

Figure 17:
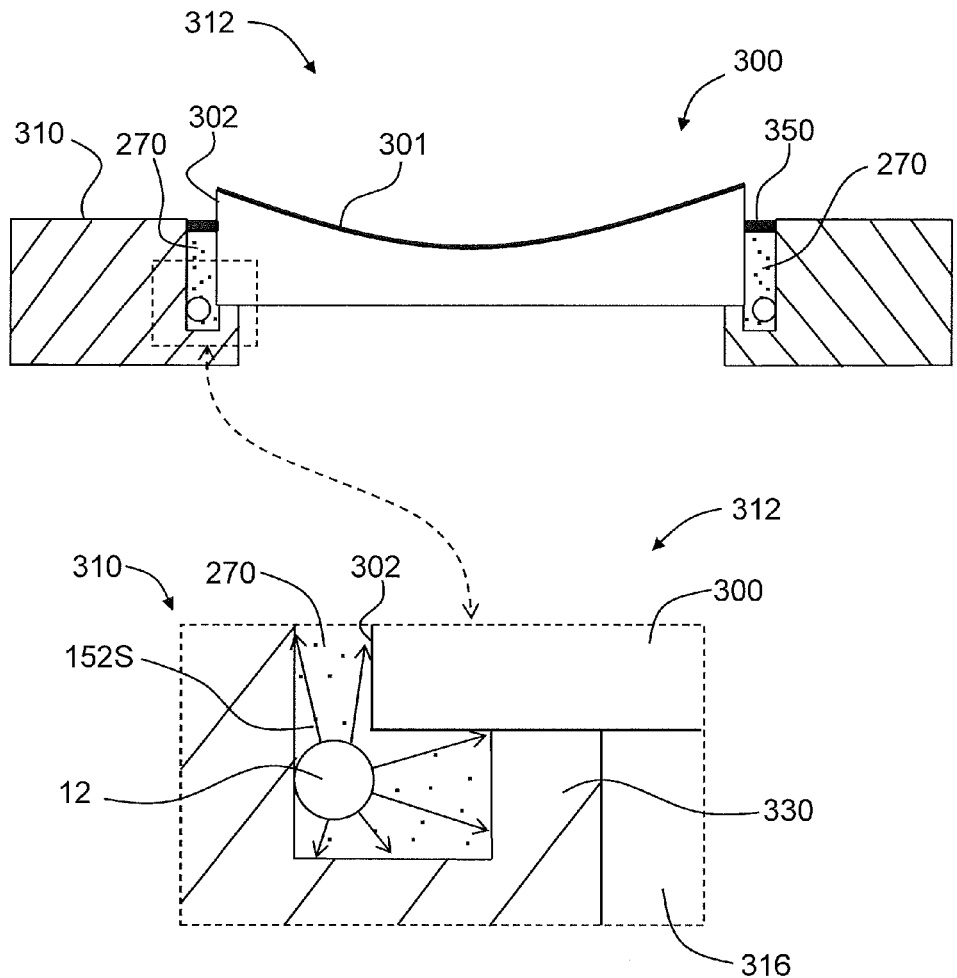
FIG. 17 is similar to FIG. 16 and illustrates an example where the optical element supported in the optics mount is in the form of a mirror.

FIG. 17 is similar to FIG. 16 and illustrates an embodiment wherein optical element 300 is in the form of a mirror having a reflective surface (e.g., a reflective coating) 301. As in the embodiment illustrated in FIG. 15, scattered actinic light 152S from light-diffusing optical fiber 12 disposed within inner ring 320 and within light-curable potting compound 270 is provided throughout the light-curable potting compound and serves to cure the light-curable potting compound.

Figure 18:
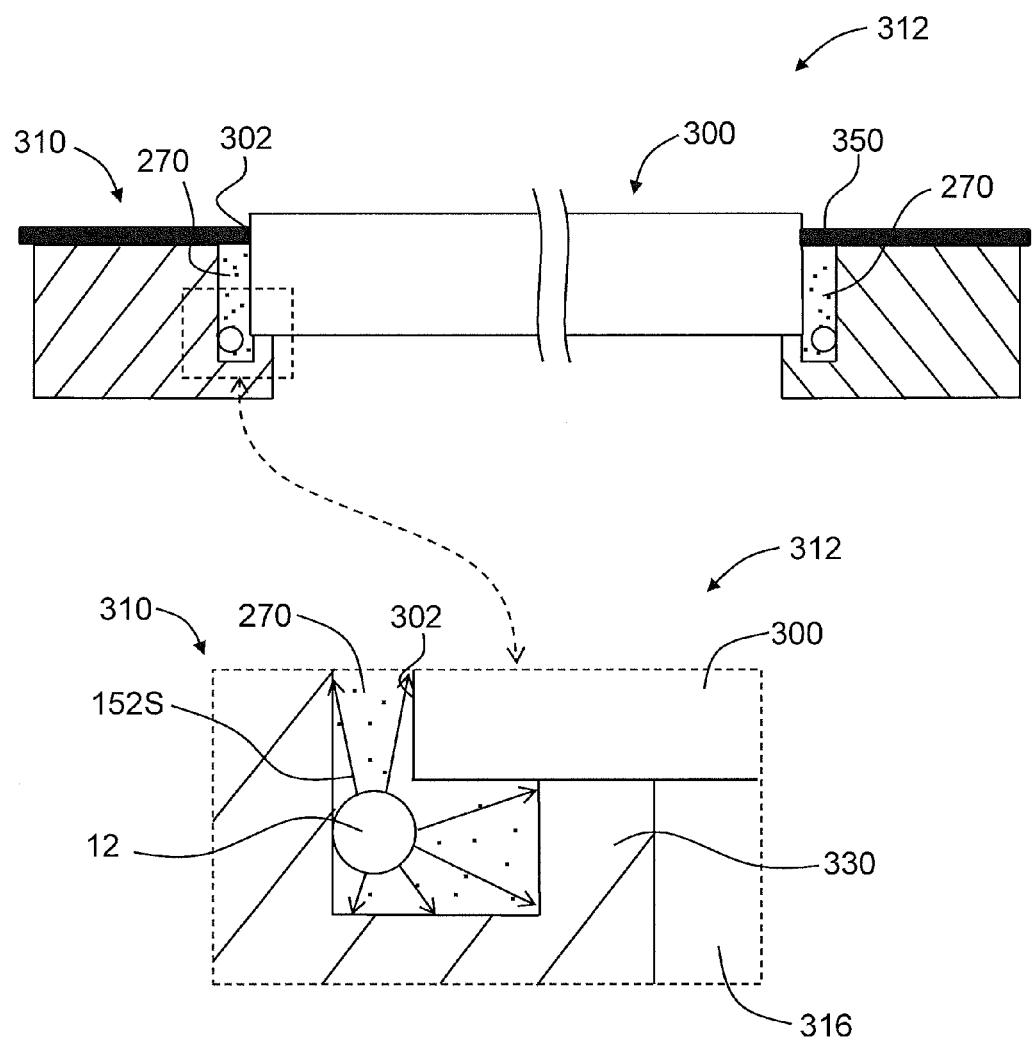
FIG. 18 is similar to FIG. 17 and illustrates an example where the optical element supported in the optics mount is in the form of planar glass sheet that can be used, for example, in a flat-panel display.

FIG. 18 is similar to FIG. 15 and illustrates an embodiment wherein optical element 300 is in the form of a planar glass sheet that can be used, for example, in a flat-panel display. Opaque shield 350 is shown as forming an opaque bezel.

Figure 19:
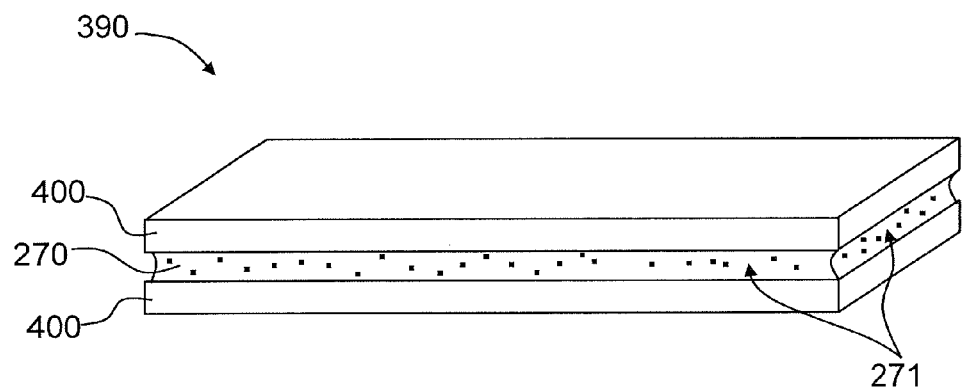
FIG. 19 is a side elevated view of an example sandwich structure formed by two opaque planar elements that sandwich a layer of photoreactive material.

FIG. 19 is a side elevated view of an example sandwich structure 390 formed by two opaque planar elements 400 that sandwich a layer of photoreactive material 270. Opaque planar elements 400 may be for example, glass sheets that are substantially opaque to actinic light 152 (e.g., by virtue of anti-reflection coatings, opaque paint, etc.), metal, plastic or other material that substantially prevents actinic light 152S from reaching all parts of photoreactive material 270.

Trying to perform a photoreaction of photoreactive material 270 through the opaque planar elements 400 of the sandwich structure 390 is problematic using conventional free-space illumination techniques.

Figure 20:
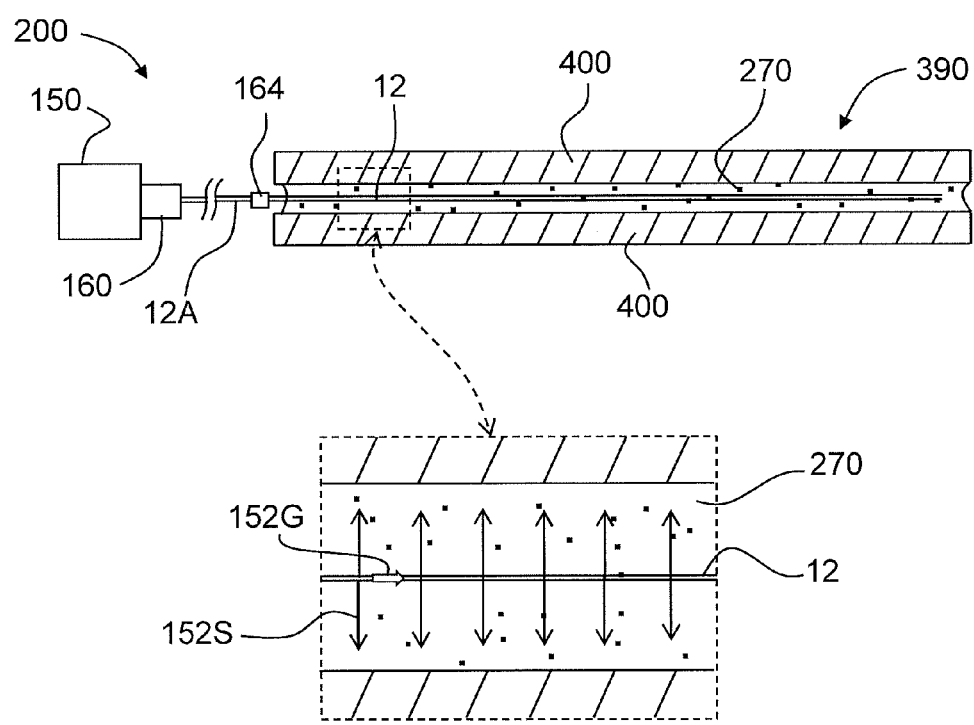
FIG. 20 is a cross-sectional view of the sandwich structure of FIG. 19, wherein a portion of the light-diffusing optical fiber of an actinic illumination system is completely embedded within the photoreactive material to deliver scattered actinic light throughout the photoreactive material.
Figure 21:
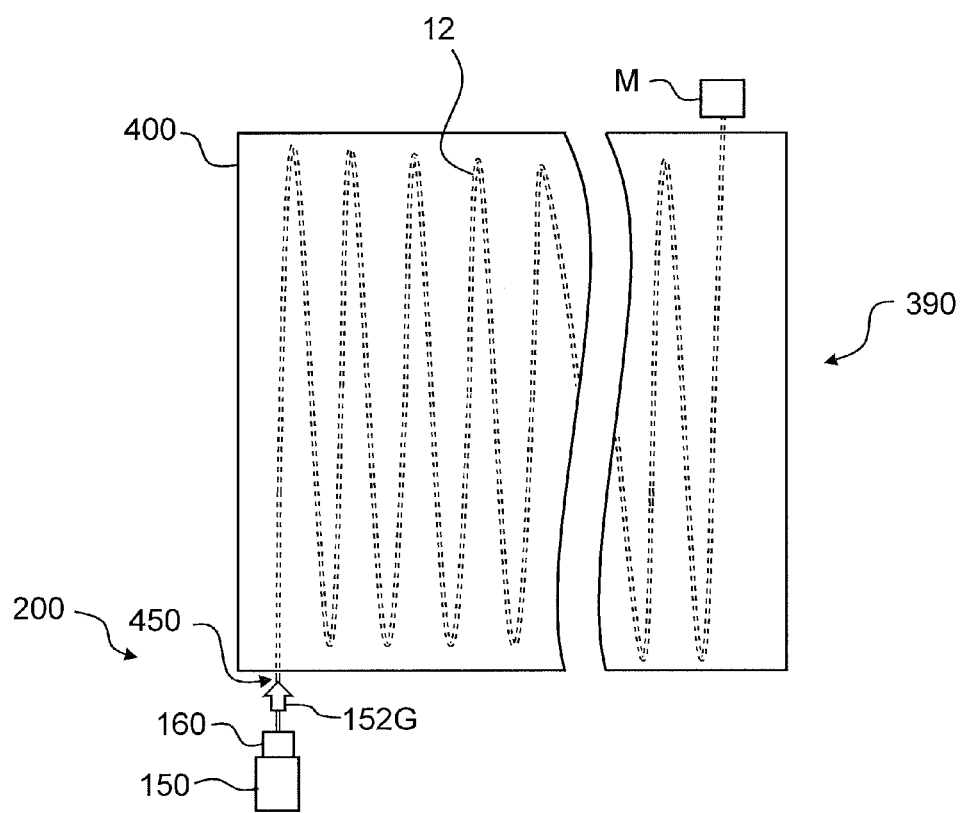
FIG. 21 is a top-down view of the sandwich structure of FIG. 19, showing an example of a serpentine configuration of the light-diffusing optical fiber portion that is embedded within the photoreactive material so that the scattered actinic light is delivered throughout the photoreactive material.

FIG. 20 is a cross-sectional view of the sandwich structure 390 of FIG. 19, wherein actinic illumination system 200 is integrated therewith for performing a photoreaction in the sandwiched photoreactive material 270. FIG. 21 is a top-down view of sandwich structure 390 that shows a serpentine configuration of light-diffusing optical fiber 12 embedded in photoreactive material 270. In an example, light-diffusing optical fiber 12 is configured so that scattered actinic light 152S can reach all parts of the photoreactive material 270 so that the photoreaction, such as photo-curing, takes place over the entire photoreactive material.

In an example embodiment where a portion of the light-diffusing optical fiber 12 is partially or completely embedded in photoreactive material 270 to perform a photoreaction using scattered actinic light 152S, the light-diffusing optical fiber remains in place after the photoreaction is completed. For example, in the case of photocuring a photo-curable material 270, light-diffusing optical fiber 12 remains embedded in the photo-cured material. In an example, the light-diffusing optical fiber 12 or the low-scatter light-conducting optical fiber 12A is cut at or near the exit point from the photo-cured material 270. An example cutting location 450 is shown in FIG. 20 by way of example.

Figure 22A:
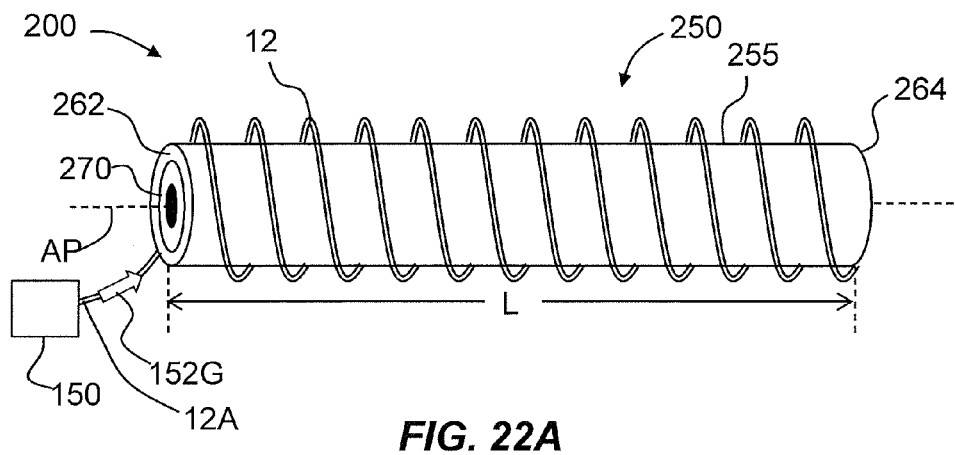
FIG. 22A is similar to FIG. 10A and illustrates an example embodiment wherein the photoreactive material resides within the interior of a container in the form of a pipe, but where the pipe is substantially transparent to the wavelength of actinic light.

FIG. 22A is similar to FIG. 10A and illustrates an example embodiment wherein photoreactive material 270 resides within interior 254 of a container in the form of a pipe 250, but wherein pipe 250 is substantially transparent to the wavelength of actinic light 152. Pipe 250 has an outer surface 255. Light-diffusing optical fiber 12 is arranged adjacent outer surface 255 of pipe 250, such as in a coiled or wound configuration as shown in FIG. 22A, as part of actinic illumination system 200.

Figure 22B:
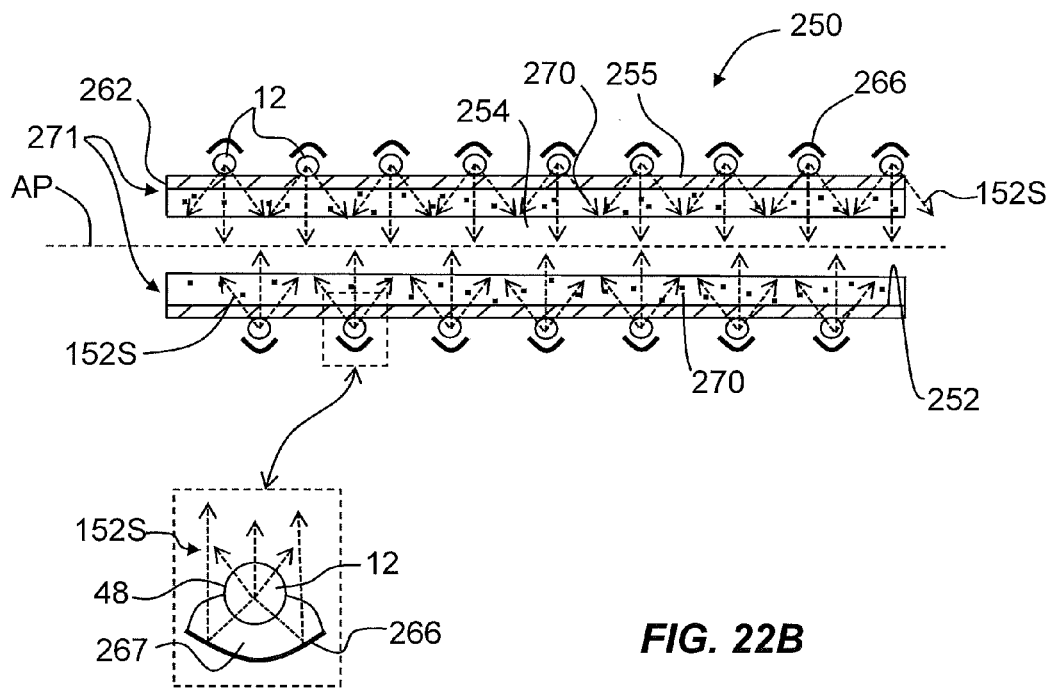
FIG. 22B is a cross-sectional view of the illumination system of FIG. 22A, and further shows an example reflecting member operably arranged relative to the light-diffusing optical fiber, and showing how the scattered actinic light travels through the transparent pipe to reach the photoreactive material contained therein.

FIG. 22B is a cross-sectional view of the pipe 250 and light-diffusing optical fiber 12 of FIG. 22A. FIG. 22B also shows an optional reflecting member 266 operably arranged adjacent light-diffusing optical fiber 12 so that scattered actinic light 152S that might not otherwise be incident upon photoreactive material 270 is directed toward pipe 250 and the photoreactive material contained therein, as illustrated in the close-up inset view. In an example embodiment, reflecting member 266 is stood off from outer surface 48 of light-diffusing optical fiber by a transparent material 267 (transparent to actinic light 152), such as an index-matching material that substantially matches the refractive index of cladding 40. In an example, transparent material 267 is adhesive. Reflecting member 266 may provide specular or diffuse reflection.

In the embodiment of illumination system 200 of FIG. 22A and FIG. 22B, scattered actinic light 152S passes through pipe 250 from outer surface 255 to interior 254 and causes a photoreaction in photoreactive material 270 within the pipe.

Figure 23A:
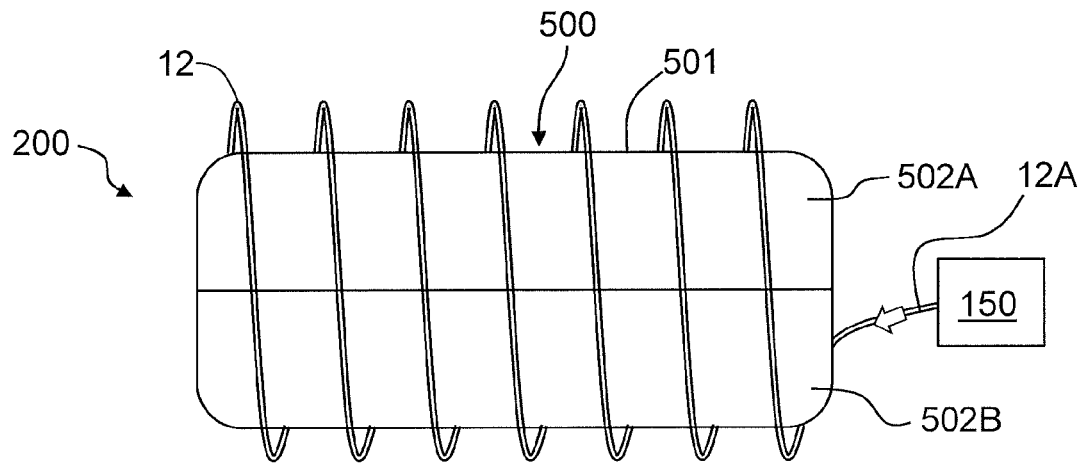
FIG. 23A is similar to FIG. 22A and illustrates and example embodiment of a transparent container having two halves and configured to form a mold that contains the photoreactive material, which is activated by scattered actinic light from a light-diffusing optical fiber disposed adjacent the outer surface of the container, wherein the scattered actinic light travels through the container halves to reach the photoreactive material.
Figure 23B:
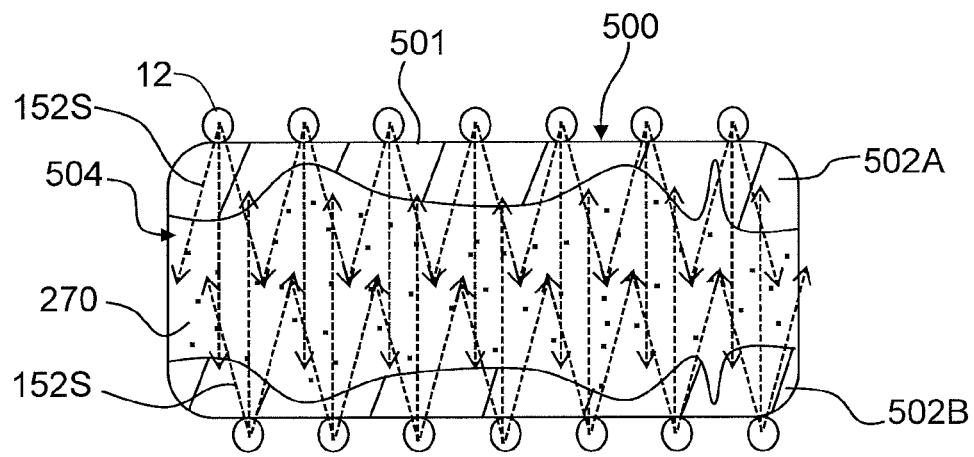
FIG. 23B is a cross-sectional view of the container and light-diffusing optical fiber configuration of FIG. 23A.
Figure 23C:
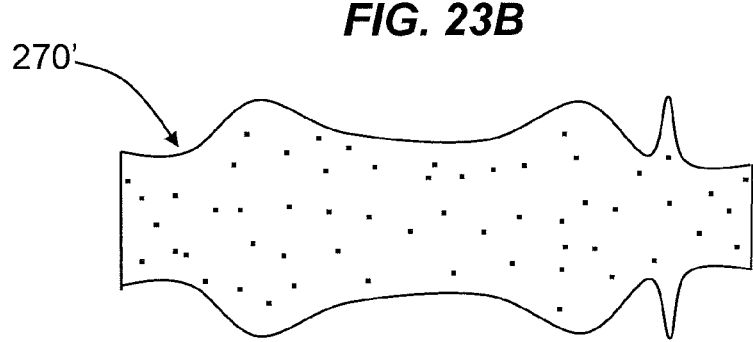
FIG. 23C is a side view of an example photocured molded body formed using the illumination system of FIG. 23A.

FIG. 23A is similar to FIG. 22A and shows an example illumination system 200 configured with a container 500 that includes an outer surface 501 and upper and lower mating halves 502A and 502B. Container 500 is shown arranged within actinic illumination system 200 and in particular with light-diffusing optical fiber 12 coiled or wound around container outer surface 501. Container 500 is transparent to a wavelength of actinic light 152. FIG. 23B is a cross-sectional view of container 500 along with light-diffusing optical 12 wound around the outside. In an example, container 500 defines an interior region 504 and constitutes a mold having a select shape and that contains photoreactive material 270. When the photoreactive material 270 is a photocurable material and is exposed to scattered actinic light 152S through the container, it undergoes photocuring. This allows container halves 502A and 502B to be separated to remove the resulting photocured molded body 270', which is shown in FIG. 23C.

Figure 24:
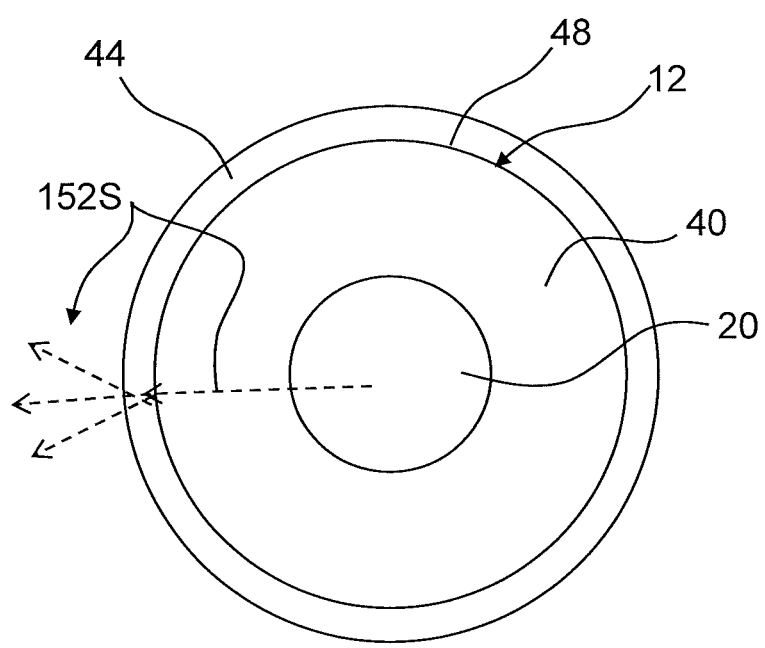
FIG. 24 is similar to FIG. 2 and illustrates an example embodiment wherein the light-diffusing optical fiber includes an outer coating adjacent the outer surface, with the outer coating configured to increase the amount of scattering of scattered actinic light as it exits the outer surface of the fiber.

FIG. 24 is similar to FIG. 2 and illustrates an example embodiment where light-diffusing optical fiber 12 includes the aforementioned outer coating 44, which as described below may be configured to increase the amount of scattering of scattered actinic light 152S as it exits the outer surface 48 of the fiber. Example outer coatings 44 include, in addition to the aforementioned examples, includes fluorescent agents and scattering agents, such as particles, or inks such as the $TiO_2$ ink discussed above. In some cases, the wavelength of scattered actinic light 152S can be changed. In embodiments, the wavelength change is selected to stay within the actinic wavelength band for photoreactive material 270. In other embodiments, the wavelength change is selected to improve the actinic wavelength, i.e., change the wavelength of scattered actinic light 152S to a wavelength at which the photoreactive material is more sensitive.

It is to be understood that the foregoing description is exemplary of the disclosure only and is intended to provide an overview for the understanding of the nature and character of the disclosure as it is defined by the claims. The accompanying drawings are included to provide a further understanding of the disclosure and are incorporated and constitute part of this specification. The drawings illustrate various features and embodiments of the disclosure which, together with their description, serve to explain the principals and operation of the disclosure. It will be apparent to those skilled in the art that various modifications to the embodiments of the disclosure as described herein can be made without departing from the spirit or scope of the disclosure as defined by the appended claims.

What is claimed is:

1. A method of performing a photoreaction using actinic light, comprising:
   disposing a light-curable potting compound in an optics mount between a portion of the optics mount and a portion of an optical element disposed within the optics mount;
   disposing a light-diffusing optical fiber relative to the light-curable potting compound, the light-diffusing optical fiber having a glass core, a cladding surrounding the glass core, and an outer surface, and further comprising a plurality of nano-sized structures situated within the glass core or at a core-cladding boundary, the nano-sized structures being configured to scatter the actinic light;

coupling the actinic light into the light-diffusing optical fiber to form guided actinic light; and scattering the guided actinic light out of the outer surface of light-diffusing optical fiber by operation of the nano-sized structures to form scattered actinic light that travels throughout the light-curable potting compound, thereby curing the light-curable potting compound.

2. The method according to claim 1, further comprising:
optically coupling the light-diffusing optical fiber to an actinic light source via a section of low-scatter, light-conducting optical fiber.

3. The method according to claim 1, further comprising either partially or completing embedding a portion of the light-diffusing optical fiber in the light-curable potting compound.

4. The method according to claim 3, further comprising leaving the portion of the light-diffusing optical fiber either partially or completely embedded within the light-curable potting compound after said curing.

5. The method according to claim 1, further comprising the light-curable potting compound comprising a photocurable polymer.

6. The method according to claim 1, further comprising:
the actinic light having an ultra-violet (UV) wavelength and the light-curable potting compound being UV-curable.

7. The method according to claim 6, further comprising:
covering the light-curable potting compound to prevent deep ultraviolet (DUV) light from degrading the light-curable potting compound.

8. The method according to claim 7, wherein said covering includes providing an opaque shield in the form of a coating, a layer or a solid member.

9. The method according to claim 1, wherein the optical component is made of glass or plastic.

10. The method according to claim 1, wherein the optical component consists of a mirror.

11. The method according to claim 1, wherein the optical component comprises a planar glass sheet.

12. The method of claim 1, further comprising shielding the light-curable potting compound from light having a wavelength that can degrade the light-curable potting compound after it is cured.

13. A method of performing a photoreaction in a photoreactive material using actinic light, comprising:
containing the photoreactive material in an interior of a container, the container having an outer surface and being substantially transparent to the actinic light;

disposing a light-diffusing optical fiber adjacent the outer surface of the container, the light-diffusing optical fiber having a glass core, a cladding surrounding the glass core, and an outer surface, the optical fiber further comprising a plurality of nano-sized structures situated within the glass core or at a core-cladding boundary, the nano-sized structures being configured to scatter the actinic light;

disposing a reflective member adjacent the light-diffusing optical fiber;

coupling the actinic light into the light-diffusing optical fiber to form guided actinic light; and scattering the guided actinic light out of the outer surface of light-diffusing optical fiber by operation of the nano-sized structures to form scattered actinic light that travels through the transparent container and throughout the photoreactive material, thereby causing the photoreaction throughout the photoreactive material, wherein a portion of the scattered actinic light is directed by the reflective member toward the photoreactive material.

14. The method according claim 13, wherein the container comprises a pipe.

15. The method according to claim 13, wherein the light-diffusing optical fiber is disposed in a wound or coiled configuration.

16. The method according to claim 13, wherein the reflective member is stood off from the light-diffusing optical fiber by a material that is transparent to the scattered actinic light.

17. The method according to claim 13, wherein the reflective member provides diffuse reflection.

18. The method according to claim 13, wherein the reflective member provides specular reflection.

19. The method according to claim 13, wherein the container is formed from upper and lower mating halves.

20. The method according to claim 13, wherein the light-scattering optical fiber includes an outer coating on its outer surface, the outer coating being configured to further scatter the scattered actinic light that leaves the outer surface.

* * * * *